US011866359B2

(12) United States Patent
Benjamin et al.

(10) Patent No.: US 11,866,359 B2
(45) Date of Patent: Jan. 9, 2024

(54) METHODS FOR FORMING CURVED GLASS ARTICLES

(71) Applicant: Corning Incorporated, Corning, NY (US)

(72) Inventors: Jeffrey Michael Benjamin, Horseheads, NY (US); Jeffrey John Domey, Elmira, NY (US); Peter Knowles, Elmira, NY (US); Khaled Layouni, Fontainebleau (FR); Christopher Mark Schweiger, Painted Post, NY (US); Christopher Lee Timmons, Big Flats, NY (US); Arlin Lee Weikel, Mansfield, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/770,804

(22) PCT Filed: Oct. 7, 2020

(86) PCT No.: PCT/US2020/054464
§ 371 (c)(1),
(2) Date: Apr. 21, 2022

(87) PCT Pub. No.: WO2021/086554
PCT Pub. Date: May 6, 2021

(65) Prior Publication Data
US 2022/0402801 A1 Dec. 22, 2022

Related U.S. Application Data
(60) Provisional application No. 62/980,796, filed on Feb. 24, 2020, provisional application No. 62/927,352, filed on Oct. 29, 2019.

(51) Int. Cl.
B32B 7/12 (2006.01)
C03B 23/035 (2006.01)
(Continued)

(52) U.S. Cl.
CPC ............ C03B 23/0357 (2013.01); B32B 1/00 (2013.01); B32B 7/12 (2013.01); B32B 17/061 (2013.01);
(Continued)

(58) Field of Classification Search
CPC ... C03B 23/0357; C03B 23/0256; B32B 1/00; B32B 7/12; B32B 17/061; B32B 17/10;
(Continued)

(56) References Cited
U.S. PATENT DOCUMENTS 3,762,903 A * 10/1973 Hamilton .......... B32B 17/10165
65/DIG. 4
10,093,156 B1 10/2018 King
(Continued)

FOREIGN PATENT DOCUMENTS

CN 208543817 U 2/2019
EP 2566658 B1 1/2019
(Continued)

OTHER PUBLICATIONS

A. Baldan, "Adhesively-bonded joints and repairs in metallic alloys, polymers and composite materials: Adhesives, adhesion theories and surface pretreatment", Journal of Materials Science, vol. 39, issue 1, Jan. 2004, pp. 1-49.
(Continued)

Primary Examiner — Megha M Gaitonde

(57) ABSTRACT

Embodiments of a method of cold-forming a glass article are disclosed. In one or more embodiments, the method includes bending a glass sheet over the chuck such that a first major surface of the glass sheets conforms to a bending surface of
(Continued)

the chuck. In one or more embodiments, the method includes adhering a frame to the second major surface of the glass sheet such that at least one spacer is positioned between the glass sheet and the frame.

4 Claims, 12 Drawing Sheets

(51) Int. Cl.
*B32B 1/00* (2006.01)
*B32B 17/06* (2006.01)
*B32B 17/10* (2006.01)
*C03C 21/00* (2006.01)

(52) U.S. Cl.
CPC ...... *B32B 17/10036* (2013.01); *C03C 21/002* (2013.01); *B32B 2250/02* (2013.01); *B32B 2307/54* (2013.01); *B32B 2605/006* (2013.01)

(58) Field of Classification Search
CPC .......... B32B 17/10036; B32B 2250/02; B32B 2307/51; B32B 2307/54; B32B 2307/542; B32B 2307/732; B32B 2605/003; B32B 2605/006; B32B 3/08; B32B 3/266; B32B 3/30; B32B 9/005; B32B 9/04; B32B 15/04; B32B 27/06; B32B 37/12; C03C 21/002; B60K 2370/1523; B60K 2370/693; Y10T 428/24628
USPC ........................................................ 428/174
See application file for complete search history.

(56) References Cited

U.S. PATENT DOCUMENTS

| | | |
|---|---|---|
| 2015/0026975 A1 | 1/2015 | Kariya et al. |
| 2016/0122225 A1 | 5/2016 | Wada et al. |
| 2016/0256827 A1 | 9/2016 | Van Der Pluijm et al. |
| 2017/0121210 A1 | 5/2017 | Rai et al. |
| 2017/0274626 A1 | 9/2017 | Ukrainczyk et al. |
| 2018/0188869 A1 | 7/2018 | Boggs et al. |
| 2019/0077262 A1 | 3/2019 | Benjamin et al. |
| 2019/0315648 A1 | 10/2019 | Kumar et al. |

FOREIGN PATENT DOCUMENTS

| | | |
|---|---|---|
| JP | 2005-111767 A | 4/2005 |
| JP | 2013-188993 A | 9/2013 |
| WO | 2012/118612 A1 | 9/2012 |
| WO | 2015/171307 A1 | 11/2015 |
| WO | 2019/055652 A1 | 3/2019 |
| WO | 2020/223056 A1 | 11/2020 |

OTHER PUBLICATIONS

Development of Novel Curing Techniques for Thermosetting Polymers and Adhesives. Phase 2, Aug. 1993.
International Search Report and Written Opinion of the International Searching Authority; PCT/US2020/054464; dated Feb. 11, 2021; 12 Pages; Commissioner for Patents.
Invitation To Pay Additional Fees of the International Searching Authority; PCT/US2020/054464; dated Nov. 20, 2020; 2 Pages; Commissioner for Patents.

* cited by examiner

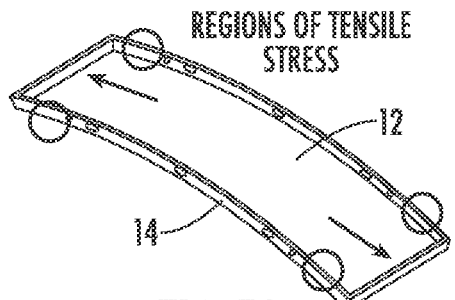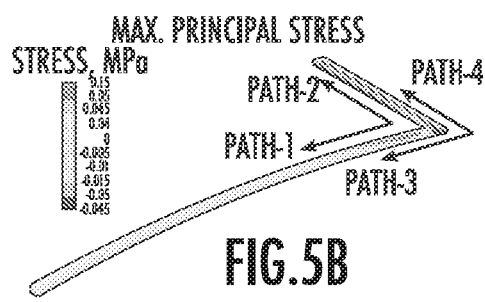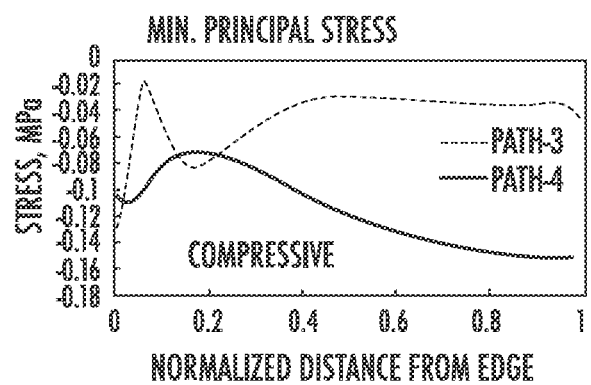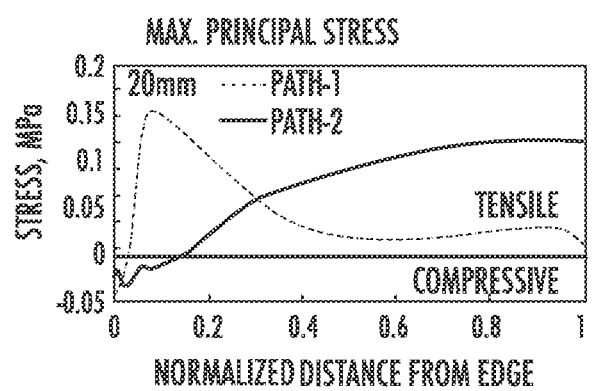

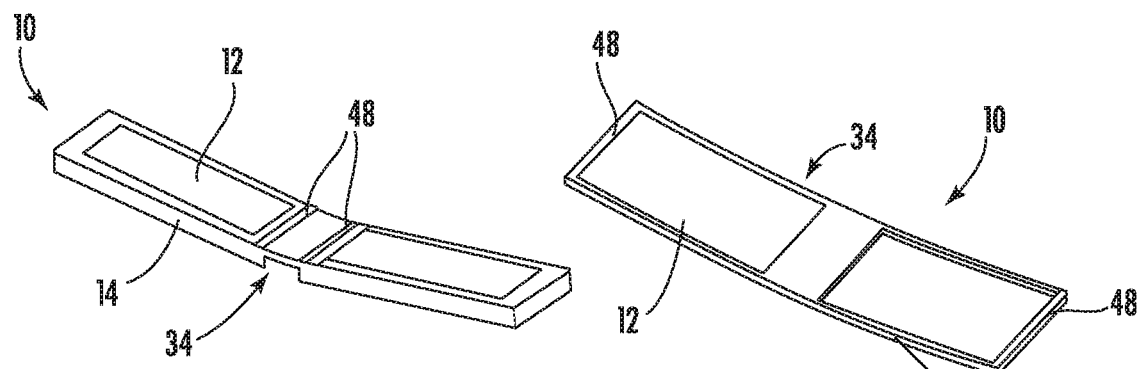
FIG.7A
FIG.7B
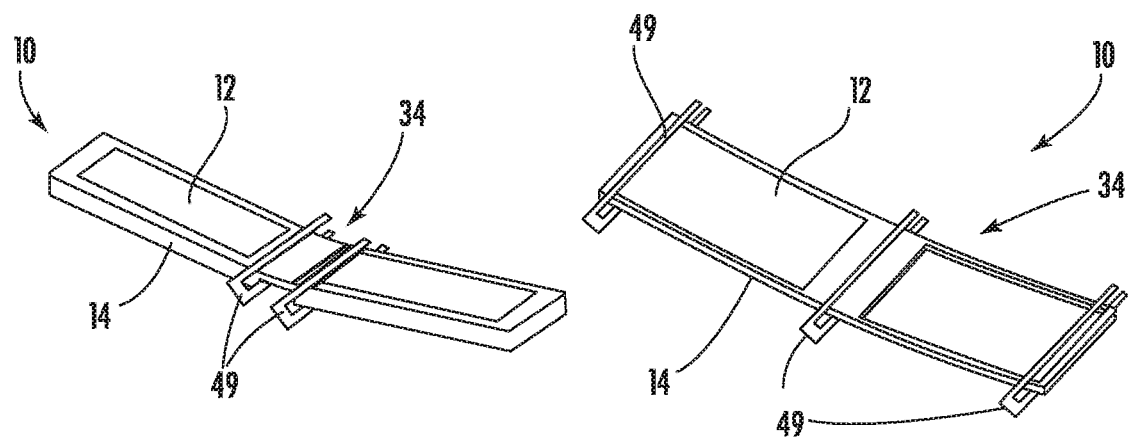
FIG.8A
FIG.8B

METHODS FOR FORMING CURVED GLASS ARTICLES

CROSS-REFERENCE TO RELATED APPLICATIONS

This application claims the benefit of priority under 35 U.S.C. § 371 of International Application No. PCT/US2020/054464, filed on Oct. 7, 2020, which claims the benefit of priority under 35 U.S.C. § 119 of U.S. Provisional Application Ser. No. 62/980,796 filed on Feb. 24, 2020, and U.S. Provisional Application Ser. No. 62/927,352 filed on Oct. 29, 2019, the content of each of which are relied upon and incorporated herein by reference in their entirety.

BACKGROUND

The disclosure relates to methods for forming curved glass articles and systems for forming curved glass articles, and more particularly to such articles for use in vehicle interior systems in which the glass is cold-formed.

Vehicle interiors include curved surfaces and can incorporate displays in such curved surfaces. The materials used to form such curved surfaces are typically limited to polymers, which do not exhibit the same durability and optical performance as glass. As such, curved glass sheets are desirable, especially when used as covers for displays. Existing methods of forming such curved glass sheet, such as thermal forming, have drawbacks including high cost, optical distortion, and surface marking. Accordingly, Applicant has identified a need for vehicle interior systems that can incorporate a curved glass articles in a cost-effective manner and without problems typically associated with glass thermal forming processes.

SUMMARY

According to an aspect, embodiments of the disclosure relate to a method of cold-forming a glass article. In one or more embodiments of the method, a chuck having a bending surface with a first region having a first radius of curvature is provided. In one or more embodiments, a glass sheet having a first major surface and a second major surface is provided. The second major surface is opposite to the first major surface. In one or more embodiments of the method, the glass sheet is bent over the chuck such that the first major surface conforms to the bending surface and comprises a first region having a first radius of curvature. In one or more embodiments, a frame having a curved surface with a second region with a second radius of curvature is provided and disposed on the second major surface of the glass article. After disposing the frame on the second major surface of the glass article, the second radius of curvature matches the first radius of curvature and is within 10% of the first radius of curvature. In one or more embodiments, at least one spacer is positioned in the first region on the second major surface of the glass sheet or in the second region on the curved surface of the frame. In one or more embodiments of the method, the method includes adhering the curved surface of the frame to the second major surface of the glass article such that the spacer is provided between the glass article and the frame. In one or more embodiments, adhering the curved surface of the frame to the second major surface of the glass article comprises curing an adhesive disposed on one or both the second major surface of the glass sheet and to the curved surface of the frame. The curved surface of the frame is adhered to the second major surface of the glass sheet using the adhesive such that the spacer is provided between the glass sheet and the frame, and a force is applied to hold the glass sheet against at least one of the chuck or the frame until the adhesive fully cures.

According to another aspect, embodiments of the disclosure relate to a method of cold-forming a glass article. In one or more embodiments of the method, the method includes bending a glass sheet over a bending surface that includes a first region with a first radius of curvature. The glass sheet includes a first major surface and a second major surface opposite to the first major surface. In one or more embodiments of the method, the method includes bending the glass sheet, causing the first major surface to conform to first radius of curvature of the bending surface. In one or more embodiments, the method includes applying an adhesive to the second major surface of the glass article or to the curved surface of the frame and curing for a first cure time. In one or more embodiments, the first cure time is performed at standard pressure and temperature, and low humidity. In one or more embodiments, the method includes disposing a frame having a curved surface including a second region with a second radius of curvature on the second major surface, wherein the second radius of curvature matches the first radius of curvature to within 10% and is within 10% of the first major surface. In one or more embodiments, the method includes adhering the curved surface of the frame to the second major surface of the glass sheet using the adhesive, and curing the adhesive for a second cure time using an accelerant. In one or more embodiments, the second cure time is less than half the first cure time.

According to still another aspect, embodiments of the disclosure relate to a system for fabricating a glass article that includes a cold-formed glass sheet adhered to a curved frame. In one or more embodiments, the system includes a chuck having a bending surface including a first region with a first curvature, and a set of clamps configured to clamp the glass sheet to the bending surface of the chuck. In one or more embodiments, the clamps are movable between a first position in which the clamps do not exert a clamping pressure on the glass sheet and a second position in which the clamps do exert a clamping pressure on the glass sheet.

According to yet another aspect, embodiments of the disclosure relate to a system for fabricating a glass article that includes a cold-formed glass sheet adhered to a curved frame. In one or more embodiments, the system includes a chuck having a bending surface with a first region with a first curvature and a heating element configured to accelerate a curing process of an adhesive adhering the glass sheet to the curved frame.

According to still yet another aspect, embodiments of the disclosure relate to a glass article that includes a glass sheet and a frame. In one or more embodiments, the glass sheet includes a first major surface and a second major surface opposite to the first major surface comprising a radius of curvature of 10,000 mm or less, and a frame adhered to the second major surface of the glass sheet using an adhesive. In one or more embodiments, the frame comprises a radius of curvature that is within 10% of the radius of curvature of the glass sheet and a bezel extending at least partially around a perimeter of the glass sheet having a width of 10 mm or less. In one or more embodiments, the glass article includes at least one mechanical retainer attached to the glass sheet and to the frame. In one or more embodiments, the at least one mechanical retainer is configured to apply a compressive stress to the first major surface of the glass sheet. In one or more embodiments, the adhesive has a tensile strength, and tensile stress is present in the adhesive from holding the glass sheet at the radius of curvature. In one or more embodiments, the compressive stress from the at least one mechanical retainer maintains a ratio of the tensile strength to the tensile stress of at least 3.0 over a range of temperatures of from −40° C. to 95° C.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 5A-5D depict the stresses on a C-shaped curved glass article.

FIGS. 7A and 7B depict the locations of spacers for a glass article having a portion that is V-shaped and a glass article having a portion that is C-shaped, respectively, according to an exemplary embodiment.

FIGS. 8A and 8B depict clamping locations for a glass article having a portion that is V-shaped and a glass article having a portion that is C-shaped for curing offline, according to exemplary embodiments.

DETAILED DESCRIPTION

Figure 1:
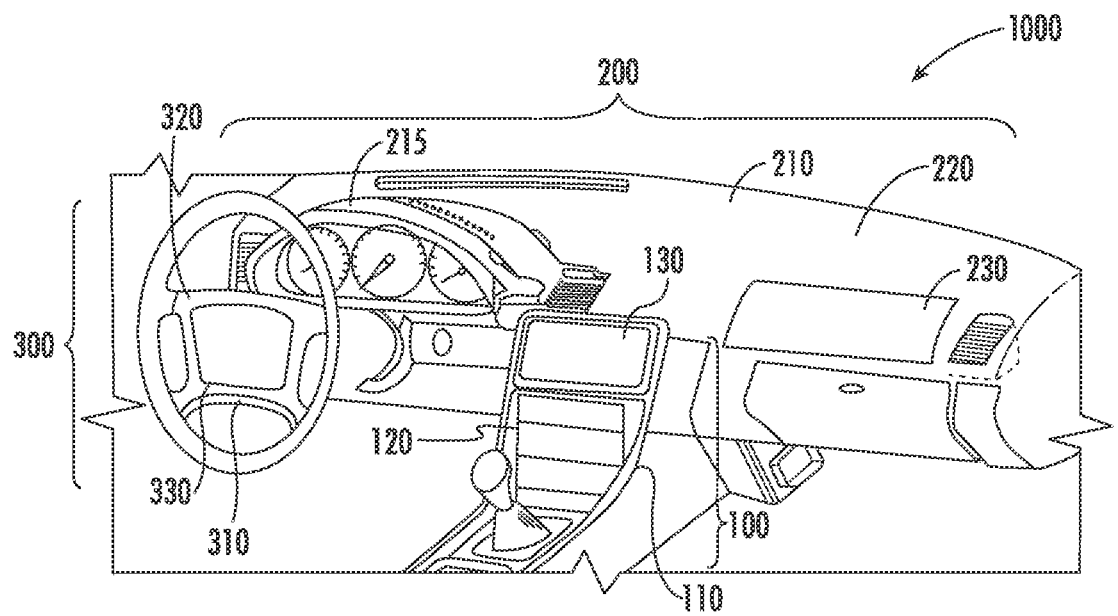
FIG. 1 is a perspective view of a vehicle interior with vehicle interior systems, according to exemplary embodiments.

Reference will now be made in detail to various embodiments of a curved glass article and methods of forming same, examples of which are illustrated in the accompanying drawings. In general, a vehicle interior system may include a variety of different curved surfaces that are designed to be transparent, such as curved display surfaces and curved non-display glass covers, and the present disclosure provides articles and methods for forming these curved surfaces from a glass material. Forming curved vehicle surfaces from a glass material provides a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

Accordingly, as will be discussed in more detail below, Applicant has developed a curved glass article and related manufacturing processes that provide an efficient and cost effective way to form a curved glass article, such as a display for a vehicle interior system, utilizing a cold-formed glass sheet.

In particular embodiments, the curved glass article is formed via a process that reduces the cycle time of a glass article in a cold-forming process, thereby increasing throughput on a processing line. Conventionally, a cold-formed glass article is formed and cured on a vacuum chuck by bending a glass sheet over the check and adhering the bent glass sheet to a frame. During curing, it is important not to move the glass article until a handling strength of the adhesive is reached. In particular, the adhesive must cure to a strength at which it can handle the stresses imparted by the stiffness of the glass tending to pull the glass sheet away from the frame. For certain adhesives, curing to the handling strength may take about an hour, which takes the chuck out of service for cold-forming other glass articles. According to the present disclosure, various ways of curing the glass article online or offline in a more expeditious manner are provided.

In an embodiment, the glass article is formed on the chuck, the glass sheet and frame are clamped together and removed from the chuck, and the glass article is allowed to cure offline. In another embodiment, the glass article is formed on the chuck, clamped to the chuck, and the chuck is moved offline to allow curing while another chuck is used to form other glass articles. In still another embodiment, the glass article is formed on the chuck and the curing process of the adhesive is accelerated (e.g., thermally or chemically) while still online to decrease the time that the chuck is used for any one glass article. Using any of these techniques will remove or diminish the processing bottleneck associated with the conventional online curing process. Each of these embodiments and others will be described in more detail below, and these descriptions are intended to be exemplary and not limiting. Further, various other aspects and advantages of the curved glass articles and method of forming same will be described in relation to the exemplary embodiments described herein and shown in the figures.

FIG. 1 shows an exemplary vehicle interior 1000 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle). In embodiments, the display 130, 230, 330 may be at least one of a light-emitting diode display, an organic light-emitting diode display, a plasma display, or a liquid crystal display bonded to a rear surface (e.g., using an optically clear adhesive) of a curved glass article 10 disclosed herein. Further, any of the display or non-display curved cover glass articles may be provided with touch functionality.

The embodiments of the curved glass article described herein can be used in each of vehicle interior systems 100, 200 and 300. Further, the curved glass articles discussed herein may be used as curved cover glasses for any of the curved display embodiments discussed herein, including for use in vehicle interior systems 100, 200 and/or 300. In embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront or color matching functionality.

Figure 2:
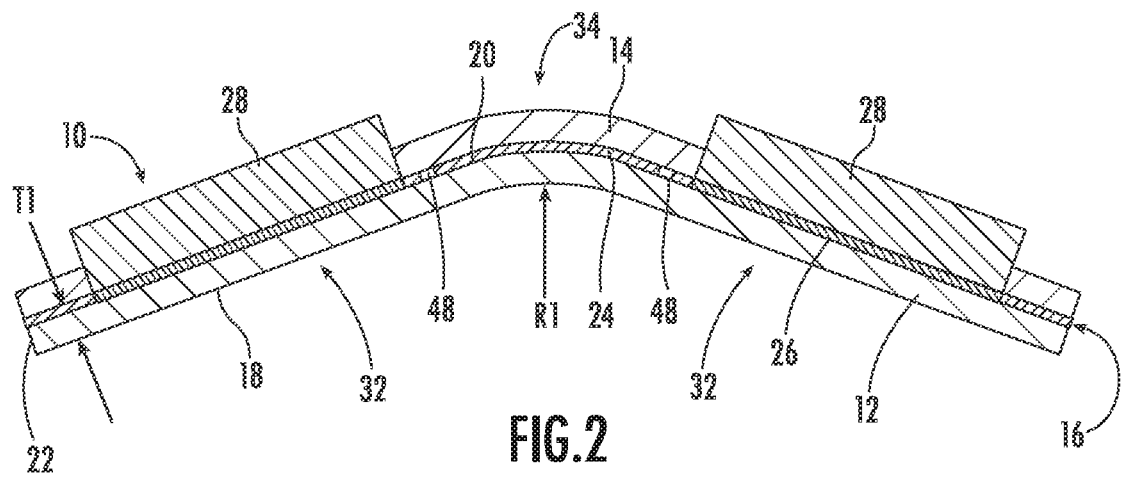
FIG. 2 depicts a cross-sectional view of a curved glass article, according to an exemplary embodiment.

FIG. 2 depicts a curved glass article 10, such as the cover glass for curved display 130, 230, 330 according to exemplary embodiments. It should be understood that, while FIG. 2 is described in terms of forming curved display 130, 230, 330, the curved glass article 10 of FIG. 2 may be used in any suitable curved glass application, including any curved glass component of any of the vehicle interior systems of FIG. 1 or other curved glass surfaces of the vehicle interior 1000. Such curved glass components could be display or non-display regions, e.g., a flat display area and a curved non-display area, curved displays, and curved display and curved non-display areas.

As shown in FIG. 2, the curved glass article 10 includes a curved glass sheet 12 bonded to a frame 14 via an adhesive layer 16. The glass sheet 12 has a first major surface 18 and a second major surface 20 opposite to the first major surface 18. The distance between the first major surface 18 and the second major surface 20 defines a thickness T1 therebetween. Further, the first major surface 18 and the second major surface 20 are connected by a minor surface 22 that extends around the periphery of the glass sheet 12.

The glass sheet 12 has a curved shape such that first major surface 18 and second major surface 20 each include at least one curved region having a radius of curvature R1. In various embodiments, R1 of glass sheet 12 is about 30 mm or greater. In embodiments, R1 is between 30 mm and 5 m. For example, R1 may be in a range from about 30 mm to about 10,000 mm, from about 50 mm to about 10,000 mm, from about 70 mm to about 10,000 mm, from about 90 mm to about 10,000 mm, from about 110 mm to about 10,000 mm, from about 150 mm to about 10,000 mm, from about 200 mm to about 10,000 mm, from about 250 mm to about 10,000 mm, from about 300 mm to about 10,000 mm, from about 350 mm to about 10,000 mm, from about 400 mm to about 10,000 mm, from about 450 mm to about 10,000 mm, from about 500 mm to about 10,000 mm, from about 550 mm to about 10,000 mm, from about 600 mm to about 10,000 mm, from about 650 mm to about 10,000 mm, from about 700 mm to about 10,000 mm, from about 750 mm to about 10,000 mm, from about 800 mm to about 10,000 mm, from about 850 mm to about 10,000 mm, from about 900 mm to about 10,000 mm, from about 950 mm to about 10,000 mm, from about 1000 mm to about 10,000 mm, from about 1500 mm to about 10,000 mm, from about 2000 mm to about 10,000 mm, from about 2500 mm to about 10,000 mm, from about 3000 mm to about 10,000 mm, from about 3500 mm to about 10,000 mm, from about 4000 mm to about 10,000 mm, from about 4500 mm to about 10,000 mm, from about 30 mm to about 9,000 mm, from about 30 mm to about 8,000 mm, from about 30 mm to about 7,000 mm, from about 30 mm to about 6,000 mm, from about 30 mm to about 5,000 mm, from about 30 mm to about 4500 mm, from about 30 mm to about 4000 mm, from about 30 mm to about 3500 mm, from about 30 mm to about 3000 mm, from about 30 mm to about 2500 mm, from about 30 mm to about 2000 mm, from about 30 mm to about 1500 mm, from about 30 mm to about 1000 mm, from about 30 mm to about 950 mm, from about 30 mm to about 900 mm, from about 30 mm to about 850 mm, from about 30 mm to about 800 mm, from about 30 mm to about 750 mm, from about 30 mm to about 700 mm, from about 30 mm to about 650 mm, from about 30 mm to about 600 mm, from about 30 mm to about 550 mm, from about 30 mm to about 500 mm, from about 30 mm to about 450 mm, or from about 30 mm to about 400 mm. In other embodiments, R1 falls within any one of the exact numerical ranges set forth in this paragraph.

Figure 21:
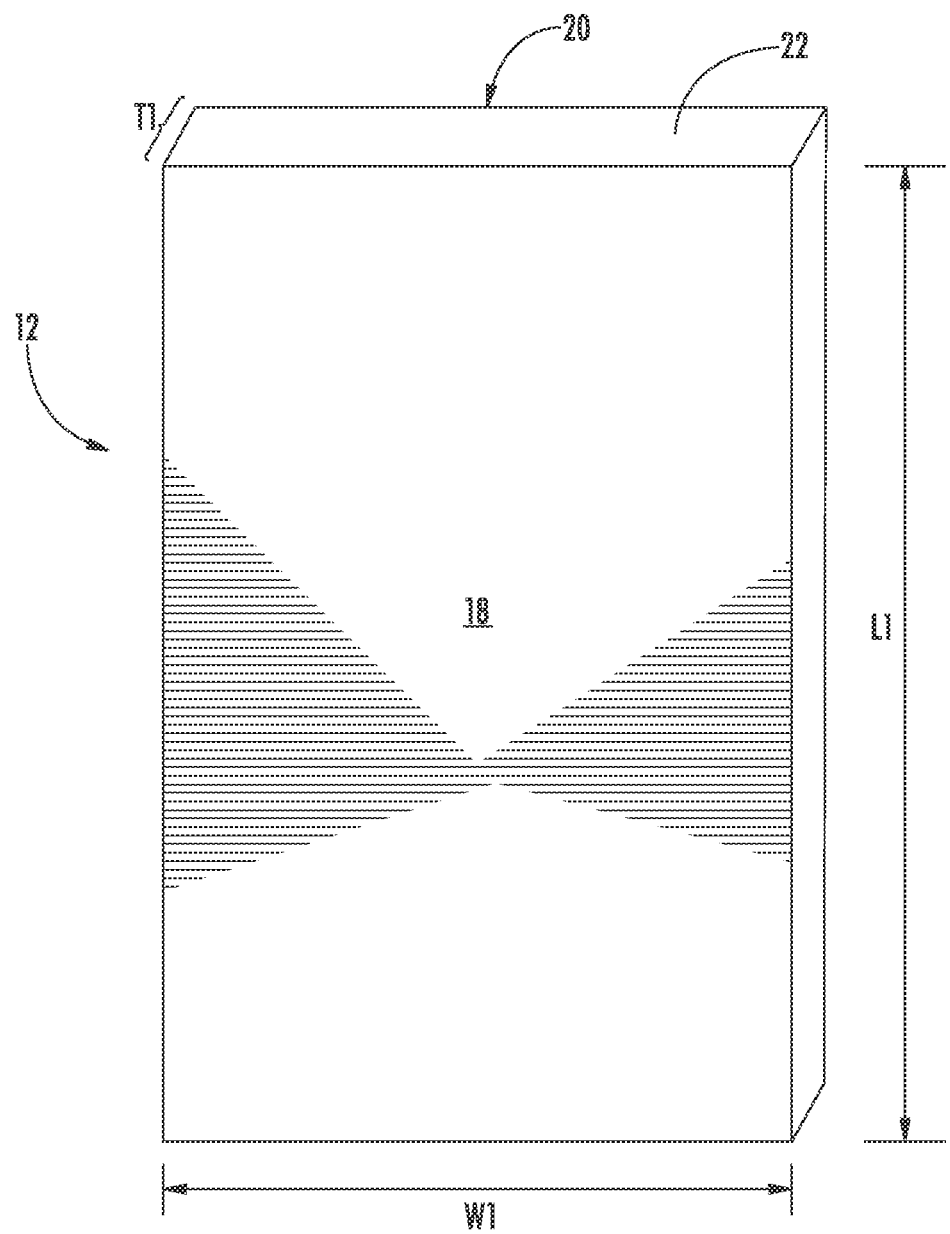
FIG. 21 depicts a glass sheet with exemplary dimensions, according to an exemplary embodiment.

Referring to FIG. 21, additional structural details of glass sheet 12 are shown and described. As noted above, glass sheet 12 has a thickness T1 that is substantially constant and is defined as a distance between the first major surface 18 and the second major surface 20. In various embodiments, T1 may refer to an average thickness or a maximum thickness of the glass sheet. In addition, glass sheet 12 includes a width W1 defined as a first maximum dimension of one of the first or second major surfaces 18, 20 orthogonal to the thickness T1, and a length L1 defined as a second maximum dimension of one of the first or second major surfaces 18 20 orthogonal to both the thickness and the width. In other embodiments, W1 and L1 may be the average width and the average length of glass sheet 12, respectively.

Further, in embodiments, the thickness T1 of the glass sheet 12 is in a range from 0.05 mm to 2 mm. In specific embodiments, T1 is less than or equal to 1.5 mm and in more specific embodiments, T1 is in a range from about 0.3 mm to 1.5 mm, from about 0.4 mm to 1.3 mm, or from about 0.5 mm to about 1.5 mm. In various embodiments, thickness T1 thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, R1 (shown in FIG. 2 of glass sheet 12 is about 30 mm or greater. For example, R1 may be in a range from about 30 mm to about 10,000 mm, from about 50 mm to about 10,000 mm, from about 70 mm to about 10,000 mm, from about 90 mm to about 10,000 mm, from about 110 mm to about 10,000 mm, from about 150 mm to about 10,000 mm, from about 200 mm to about 10,000 mm, from about 250 mm to about 10,000 mm, from about 300 mm to about 10,000 mm, from about 350 mm to about 10,000 mm, from about 400 mm to about 10,000 mm, from about 450 mm to about 10,000 mm, from about 500 mm to about 10,000 mm, from about 550 mm to about 10,000 mm, from about 600 mm to about 10,000 mm, from about 650 mm to about 10,000 mm, from about 700 mm to about 10,000 mm, from about 750 mm to about 10,000 mm, from about 800 mm to about 10,000 mm, from about 850 mm to about 10,000 mm, from about 900 mm to about 10,000 mm, from about 950 mm to about 10,000 mm, from about 1000 mm to about 10,000 mm, from about 1500 mm to about 10,000 mm, from about 2000 mm to about 10,000 mm, from about 2500 mm to about 10,000 mm, from about 3000 mm to about 10,000 mm, from about 3500 mm to about 10,000 mm, from about 4000 mm to about 10,000 mm, from about 4500 mm to about 10,000 mm, from about 30 mm to about 9,000 mm, from about 30 mm to about 8,000 mm, from about 30 mm to about 7,000 mm, from about 30 mm to about 6,000 mm, from about 30 mm to about 5,000 mm, from about 30 mm to about 4500 mm, from about 30 mm to about 4000 mm, from about 30 mm to about 3500 mm, from about 30 mm to about 3000 mm, from about 30 mm to about 2500 mm, from about 30 mm to about 2000 mm, from about 30 mm to about 1500 mm, from about 30 mm to about 1000 mm, from about 30 mm to about 950 mm, from about 30 mm to about 900 mm, from about 30 mm to about 850 mm, from about 30 mm to about 800 mm, from about 30 mm to about 750 mm, from about 30 mm to about 700 mm, from about 30 mm to about 650 mm, from about 30 mm to about 600 mm, from about 30 mm to about 550 mm, from about 30 mm to about 500 mm, from about 30 mm to about 450 mm, or from about 30 mm to about 400 mm. In other embodiments, R1 falls within any one of the exact numerical ranges set forth in this paragraph.

Applicant has found that such thin glass sheets can be cold formed to a variety of curved shapes (including the relatively tight radii of curvature discussed herein) utilizing cold forming without breakage while at the same time providing for a high quality cover layer for a variety of vehicle interior applications. In addition, such thin glass sheets 12 may deform more readily, which could potentially compensate for shape mismatches and gaps that may exist relative to the frame 14.

In various embodiments, glass sheet 12 is formed from a strengthened glass sheet (e.g., a thermally strengthened glass material, a chemically strengthened glass sheet, etc.) In such embodiments, when glass sheet 12 is formed from a strengthened glass material, first major surface 18 and second major surface 20 are under compressive stress, and thus second major surface 20 can experience greater tensile stress during bending to the convex shape without risking fracture. This allows for strengthened glass sheet 12 to conform to more tightly curved surfaces.

A feature of a cold-formed glass sheet 12 is an asymmetric surface compressive stresses between the first major surface 18 and the second major surface 20 once the glass sheet 12 has been bent to the curved shape. In such embodiments, prior to the cold-forming process or being cold-formed, the respective compressive stresses in the first major surface 18 and the second major surface 20 of glass sheet 12 are substantially equal. After cold-forming, the compressive stress on concave first major surface 18 increases such that the compressive stress on the first major surface 18 is greater after cold-forming than before cold-forming. In contrast, convex second major surface 20 experiences tensile stresses during bending causing a net decrease in surface compressive stress on the second major surface 20, such that the compressive stress in the second major surface 20 following bending is less than the compressive stress in the second major surface 20 when the glass sheet is flat.

In addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes can damage or decrease the optical properties of curved glass sheets, and thus, the curved glass sheets formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, haptic coatings, easy-to-clean coating, etc.) are applied via deposition processes, such as sputtering processes that are typically ill-suited for coating curved glass articles. In addition, many surface treatments (e.g., anti-glare coatings, anti-reflective coatings, haptic coating, easy-to-clean coating, etc.) also are not able to survive the high temperatures associated with hot-bending processes. Thus, in particular embodiments discussed herein, one or more surface treatments are applied to the first major surface 18 and/or to the second major surface 20 of glass sheet 12 prior to cold-bending, and the glass sheet 12 including the surface treatment is bent to a curved shape as discussed herein. Thus, Applicant believes that the processes and systems discussed herein allow for bending of glass after one or more coating materials have been applied to the glass, in contrast to typical hot-forming processes.

In various embodiments, first major surface 18 and/or the second major surface 20 of glass sheet 12 includes one or more surface treatments or layers. The surface treatment may cover at least a portion of the first major surface 18 and/or second major surface 20. Exemplary surface treatments include anti-glare surfaces/coatings, anti-reflective surfaces/coatings, haptic surfaces/coatings, and an easy-to-clean surface coating/treatment. In one or more embodiments, at least a portion of the first major surface 18 and/or the second major surface 20 may include any one, any two, any three, or all four of an anti-glare surface, an anti-reflective surface, haptic surface, and easy-to-clean coating/treatment. In one example, the first major surface 18 includes an anti-reflective coating. In another example, first major surface 18 may include an anti-glare surface and second major surface 20 may include an anti-reflective surface. In another example, first major surface 18 includes an anti-reflective surface and second major surface 20 includes an anti-glare surface. In yet another example, the second major surface 20 comprises either one of or both the anti-glare surface and the anti-reflective surface, and the first major surface 18 includes the easy-to-clean coating. In one or more embodiments, the first major surface 18 includes an anti-reflective coating disposed on the first major surface and an easy-to-clean coating on the anti-reflective coating.

In embodiments, the glass sheet 12 may also include a decorative layer on the first major surface 18 and/or second major surface 20. The decorative layer may include any aesthetic design formed from, e.g., a pigment, a dye, an ink, paint, and the like and can include a wood-grain design, a brushed metal design, a graphic design, a portrait, or a logo. The decorative layer may be printed onto the glass sheet. In one or more embodiments, the anti-glare surface includes an etched surface. In one or more embodiments, the anti-reflective surface includes a multi-layer coating.

In general, glass sheet 12 is cold-formed to the desired curved shape via application of a bending force to the glass sheet 12 and attaching the cold-formed glass sheet to a support structure, such as a frame 14. In embodiments, the cold forming process is performed at a temperature less than the glass softening point or glass transition temperature of the glass sheet 12. In particular, the cold forming process may be performed at room temperature (e.g., about 20° C.) or a slightly elevated temperature, e.g., at 200° C. or less, 150° C. or less, 100° C. or less, or at 50° C. or less. In various embodiments, a cold-formed glass sheet 12 may be cold-formed have a compound curve including a major radius and a cross curvature. A complexly curved cold-formed glass sheet 12 may have a distinct radius of curvature in two independent directions. According to one or more embodiments, a complexly curved cold-formed glass sheet 12 may thus be characterized as having "cross curvature," where the cold-formed glass sheet 12 is curved along an axis (i.e., a first axis) that is parallel to a given dimension and also curved along an axis (i.e., a second axis) that is perpendicular to the same dimension. The curvature of the cold-formed glass sheet and the curved display can be even more complex when a significant minimum radius is combined with a significant cross curvature, and/or depth of bend. In various embodiments, glass sheet 12 can have more than two curved regions with the same or differing curved shapes. In some embodiments, glass sheet 12 can have one or more region having a curved shape with a variable radius of curvature.

As shown in FIG. 2, the adhesive layer 16 is disposed on the second major surface 20 of the glass sheet 12. In embodiments, the adhesive layer 16 includes a first adhesive 24 and a second adhesive 26. The first adhesive 24 bonds the frame 14 to the second major surface 20 of the glass sheet 12, and the second adhesive 26 bonds one or more displays 28 to the second major surface 20 of the glass sheet 12. In the embodiment depicted, the glass article 10 includes two displays 28 bonded to the second major surface 20 of the glass sheet 12 with the frame 14 surrounding the displays 28. In particular, the frame 14 includes apertures configured to accommodate the displays 28. In an embodiment, the first adhesive 24 is a structural adhesive, and the second adhesive 26 is an optically clear adhesive. Various methods of cold-forming the glass article 10 are discussed below primarily in relation to the glass sheet 12, first adhesive 24, and the frame 14. It should be noted that the displays 28 can be bonded to the second major surface 20 of the glass sheet 12 using the second, optically clear adhesive 26 either before or after the cold forming processes described herein. However, it will be apparent based on the particular method disclosed whether bonding the displays 28 to the glass sheet 12 is more appropriate before or after cold-forming (for instance, the use of steam or elevated temperatures to accelerate curing may dictate that the display be bonded to the glass sheet 12 after the cold-forming process).

In embodiments, the first adhesive 24 provides long term strength after curing over the course of, e.g., about an hour at standard pressure and temperature and 0% humidity. In embodiments, exemplary adhesives for the first adhesive 24 include toughened epoxy, flexible epoxy, acrylics, silicones, urethanes, polyurethanes, and silane modified polymers. In specific embodiments, the first adhesive 24 includes one or more toughened epoxies, such as EP21TDCHT-LO (available from Masterbond®, Hackensack, NJ), 3M™ Scotch-Weld™Epoxy DP460 Off-White (available from 3M, St. Paul, MN). In other embodiments, the first adhesive 24 includes one or more flexible epoxies, such as Masterbond EP21TDC-2LO (available from Masterbond®, Hackensack, NJ), 3M™ Scotch-Weld™ Epoxy 2216 B/A Gray (available from 3M, St. Paul, MN), and 3M™ Scotch-Weld™ Epoxy DP125. In still other embodiments, the first adhesive 24 includes one or more acrylics, such as LORD® Adhesive 410/Accelerator 19 w/LORD® AP 134 primer, LORD® Adhesive 852/LORD® Accelerator 25 GB (both being available from LORD Corporation, Cary, NC), DELO PUR SJ9356 (available from DELO Industrial Adhesives, Windach, Germany), Loctite® AA4800, Loctite® HF8000. TEROSON® MS 9399, and TEROSON® MS 647-2C (these latter four being available from Henkel AG & Co. KGaA, Dusseldorf, Germany), among others. In yet other embodiments, the first adhesive 24 includes one or more urethanes, such as DOW BetaSeal x2500, 3M™ Scotch-Weld™ Urethane DP640 Brown and 3M™ Scotch-Weld™ Urethane DP604, and in still further embodiments, the first adhesive 24 includes one or more silicones, such as Dow Corning® 995 (available from Dow Corning Corporation, Midland, MI).

In the embodiment depicted, the glass article 10 includes a V-shaped portion, having two flat sections 32 disposed on either side of a bend region 34. In other embodiments, the glass article 10 may be, for example, C-shaped (continuously curved bend region 34 between lateral ends of the curved glass article 10), J-shaped (one flat section 32 and one bend region 34), or S-shaped (two bend regions 34 with opposite curvatures), among other possible configurations. Each display 28 may be any of a variety of suitable display types, such as liquid crystal display (LCD), light emitting diode (LED), organic LED (OLED), or a plasma display. Further, each display 28 may be a flat display or a curved display. Thus, the display 28 may be disposed on any of the flat sections 32 or bend regions 34 of the glass article 10. In the embodiment of FIG. 2, the two displays 28 are each provided in a flat section 32 of the glass article 10 having a portion that is V-shaped. It should be understood that a single display or more than two displays may be used. In one or more embodiments, touch panels may be used instead of or in addition to the displays. In some embodiments, the display(s) used may have touch functionality.

Figure 3:
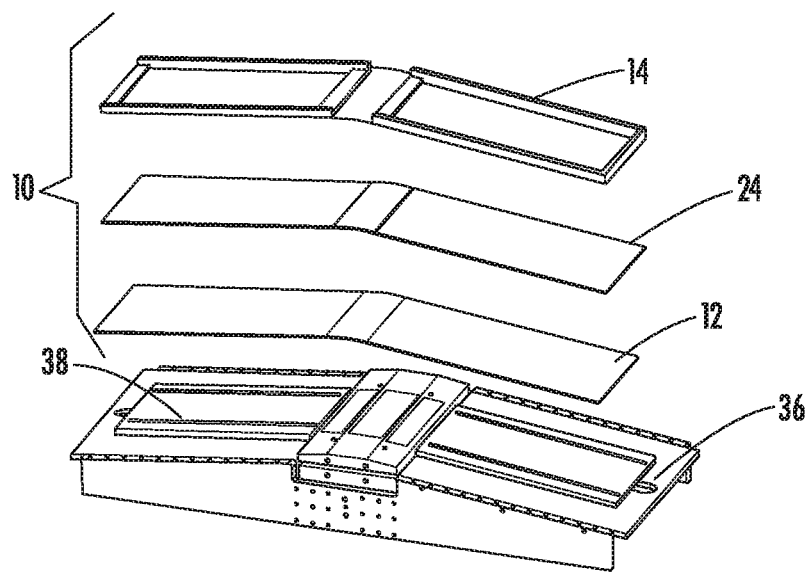
FIG. 3 depicts an exploded view of a curved glass article and a chuck, according to an exemplary embodiment.

FIG. 3 depicts an exploded view of a glass article 10 having a portion that is V-shaped on a chuck 36 used to cold form the glass article 10. In accordance with one or more embodiments, the glass article 10 is formed by cold forming the glass sheet 12 by pressing the first major surface 18 against a bending surface 38 of the chuck 36. Thereafter, embodiments of the method include applying the first adhesive 24 over the second major surface 20 of the glass sheet 12, and pressing the frame 14 against the first adhesive 24. Thus, the bending surface 38 initially defines the first radius of curvature of the glass sheet 12. The frame 14 includes a curved surface having a second radius of curvature. In embodiments, the second radius of curvature for the curved surface of the frame 14 substantially matches the first radius of curvature of the bending surface, e.g., the first radius of curvature is within 10%, within 5%, or even within 2% of the second radius of curvature. Thereafter the adhered frame 14 and glass sheet 12 may be removed from the bending surface 38 of the chuck 36 to provide the glass article 10.

In one or more embodiments, the frame 14 is made from a rigid material (such as a metal, a ceramic, a composite, or a plastic), and after application of the first adhesive 24 and pressing of the frame 14 against the glass sheet 12, the curved surface of the rigid frame 14 maintains the curvature of the glass sheet 12.

Figure 4:
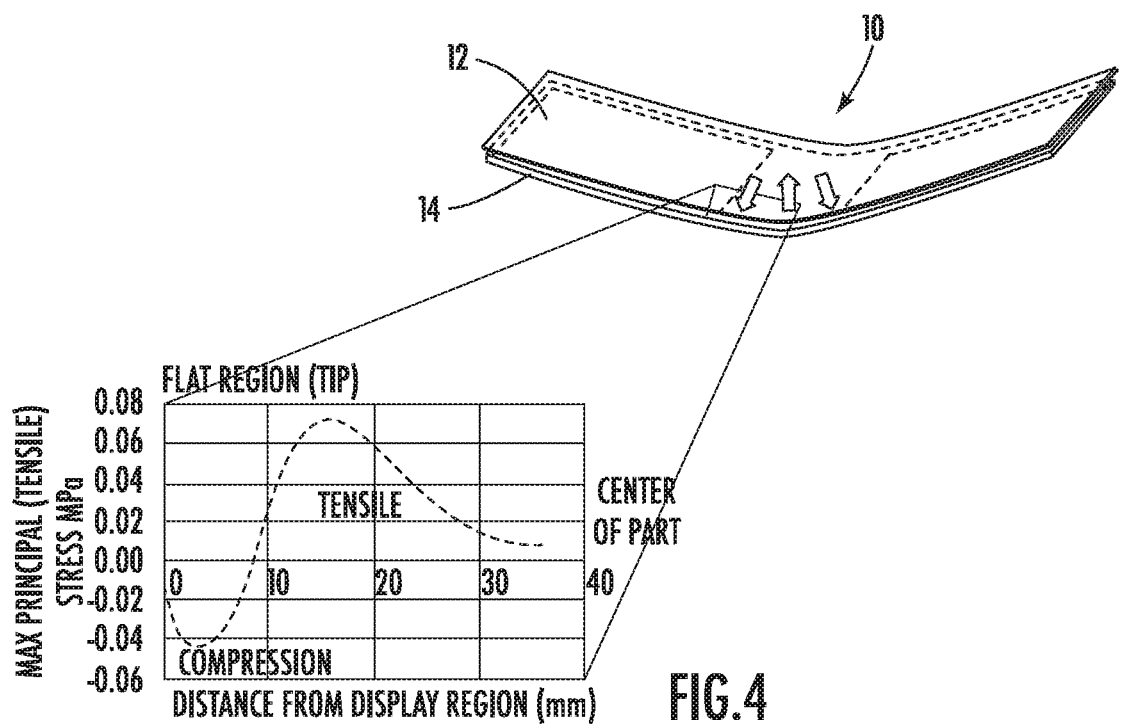
FIG. 4 depicts a V-shaped curved glass article along with a graph of the stress on the glass sheet in the region between the display areas.

FIG. 4 depicts the stress across the glass sheet 12 of a glass article 10 having a portion that is V-shaped. Beginning at the edge of the display area, the stress is slightly compressive and increases in compression until a distance of about 5 mm is reached. Thereafter, the stress decreases in compression, and at about 9 mm, the stress transitions to tensile stress, which increases until reaching a peak at a distance of about 15 mm to 17 mm from the edge of the display area. After the peak, the tensile stress decreases as the distance from the display area increases going towards the center of the glass article 10. According to an embodiment of the present disclosure, various ways of holding the glass sheet 12 in place in the region of high tensile stress during cold forming of a glass article 10 having a portion that is V-shaped are provided.

FIGS. 5A-5D depict the maximum stress on the surface of the glass sheet 12 for a glass article 10 having a portion that is C-shaped. FIG. 5A generally identifies the regions of tensile stress (circles) on the glass sheet 12. FIG. 5B depicts a stress plot for various traces along the surface of the glass sheet 12. As can be seen in FIG. 5C, the stress for the traces of path 3 and path 4 are compressive over their entire distance, but as can be seen in FIG. 5D, the stress for the traces of path 1 and 2 on the interior of the glass sheet 12 almost entirely in tension. In particular, path 1 exhibits a peak stress at about 20 mm from the edge (about 0.1 in the normalized distance). According to the present disclosure, various ways of holding the glass sheet 12 in place in the region of high tensile stress during cold forming of a C-shaped glass article 10 are also provided.

Figure 6:
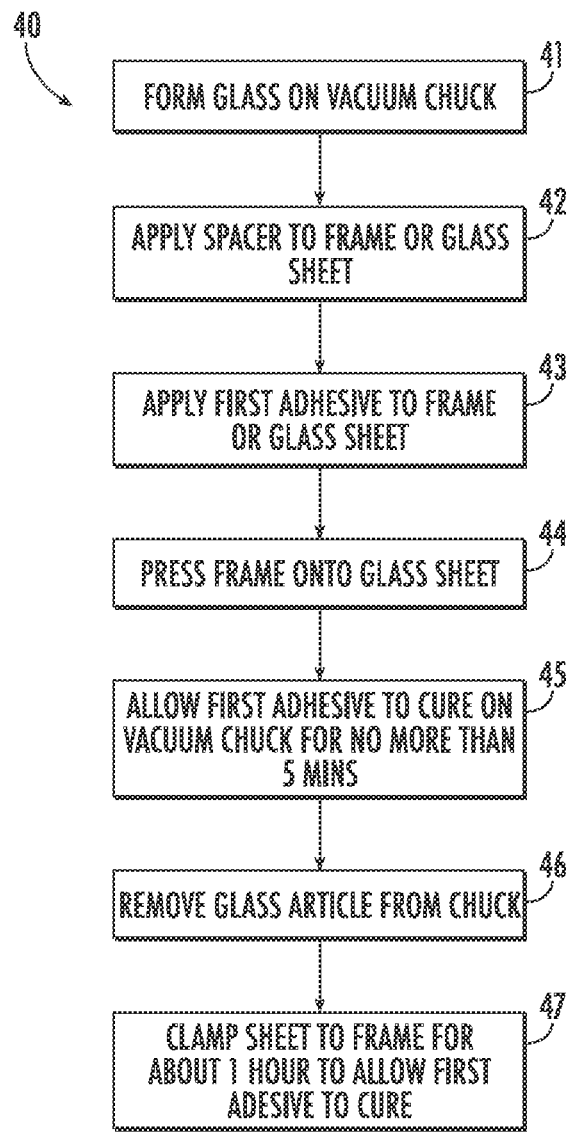
FIG. 6 depicts a flow diagram of a first method of forming a curved glass article, according to an exemplary embodiment.

FIG. 6 depicts a flow diagram of a first method 40 of forming the glass article that decreases the time the glass article 10 must spend on the chuck 36 during cold forming. According to a first step 41 of the method 40, the glass sheet 12 is cold-formed on the chuck 36 by pressing the glass sheet 12 against the bending surface 38 of the chuck 36. The glass sheet 12 may be maintained against the bending surface 38 through vacuum pressure. In embodiments, the vacuum between the first major surface 18 and the bending surface 38 is formed using ports to the curved surface 38 that pulls the air from between the first major surface 18 and the bending surface 38, and in other embodiments, a vacuum bag can be placed around the chuck 36, frame 14, and glass sheet 12 to hold the glass sheet 12 in the cold-formed shape.

In a second step 42, one or more spacers 48 (as shown in FIGS. 2, 7A, and 7B) are applied to the glass sheet 12 or to the frame 14 such that, in the glass article 10, the spacers 48 are located between the glass sheet 12 and the frame 14. With reference to FIGS. 7A and 7B, each spacer 48 is applied at the edges of the bend region 34 of the glass article 10. In particular, the spacers 48 are positioned where compression of the bond line could occur and is desired to be prevented. The spacers 48 are selected to have a higher modulus or stiffness than the surrounding first adhesive 24 prior to full cure (the spacer 48 may have a modulus or stiffness equivalent to or even less than the first adhesive 24 after the first adhesive 24 has fully cured). For example, in embodiments, the spacers 48 have an elastic modulus of at least 4 MPa, at least 10 MPa, or at least 20 MPa, and the first adhesive 24 has an elastic modulus of about 5 MPa or less, 2 MPa or less, or 1 MPa or less. In one or more embodiments, the spacers 48 have an elastic modulus in a range from about 4 MPa to about 50 MPa, from about 5 MPa to about 50 MPa, from about 6 MPa to about 50 MPa, from about 8 MPa to about 50 MPa, from about 10 MPa to about 50 MPa, from about 12 MPa to about 50 MPa, from about 14 MPa to about 50 MPa, from about 15 MPa to about 50 MPa, from about 16 MPa to about 50 MPa, from about 18 MPa to about 50 MPa, from about 20 MPa to about 50 MPa, from about 22 MPa to about 50 MPa, from about 24 MPa to about 50 MPa, from about 25 MPa to about 50 MPa, from about 26 MPa to about 50 MPa, from about 28 MPa to about 50 MPa, from about 30 MPa to about 50 MPa, from about 32 MPa to about 50 MPa, from about 34 MPa to about 50 MPa, from about 35 MPa to about 50 MPa, from about 36 MPa to about 50 MPa, from about 38 MPa to about 50 MPa, from about 40 MPa to about 50 MPa, from about 5 MPa to about 45 MPa, from about 5 MPa to about 40 MPa, from about 5 MPa to about 35 MPa, from about 5 MPa to about 30 MPa, from about 5 MPa to about 25 MPa, from about 5 MPa to about 20 MPa, or from about 5 MPa to about 15 MPa. In one or more embodiments, the adhesive 24 has an elastic modulus in a range from about 0.1 MPa to about 5 MPa, from about 0.2 MPa to about 5 MPa, from about 0.25 MPa to about 5 MPa, from about 0.5 MPa to about 5 MPa, from about 0.75 MPa to about 5 MPa, from about 1 MPa to about 5 MPa, from about 1.5 MPa to about 5 MPa, from about 2 MPa to about 5 MPa, from about 2.5 MPa to about 5 MPa, from about 3 MPa to about 5 MPa, from about 3.5 MPa to about 5 MPa, from about 4 MPa to about 5 MPa, from about 0.1 MPa to about 4.5 MPa, from about 0.1 MPa to about 4 MPa, from about 0.1 MPa to about 3.5 MPa, from about 0.1 MPa to about 3 MPa, from about 0.1 MPa to about 2.5 MPa, from about 0.1 MPa to about 2 MPa, from about 0.1 MPa to about 1.5 MPa, from about 0.1 MPa to about 1 MPa, or from about 0.1 MPa to about 0.5 MPa.

In one or more embodiments, the spacers 48 may be an adhesive material or not have adhesive properties. In an embodiment, the spacer is a strip of pressure sensitive adhesive (e.g., 3M VHB tape) or an elastomeric material. In another embodiment, the frame 14 is molded or formed with bumps or a ridge that acts as the spacer 48.

For a the glass article 10 shown in FIG. 7A having a portion that is V-shaped, the spacers 48 are located towards the center of the glass article 10 proximal to each transition between the flat sections 32 and bend region 34, and for the glass article 10 shown in FIG. 7B having a portion that is C-shaped, the spacers 48 are located towards the edges of the glass article 10 because of the continuous curvature of the glass sheet 12 that spans substantially the entire length of the glass article 12. In embodiments, the spacers 48 has a thickness that is substantially equal to the thickness of the rest of the adhesive layer 16, e.g., from about 1.0 mm to about 4.0 mm, and particularly about 2.0 mm. Further, the spacers 48 are selected to be relatively thin, especially if they do not provide adhesion between the glass sheet 12 and frame 14, and in embodiments each spacer 48 has a width of from 1.0 mm to 10.0 mm.

After the spacers 48 are positioned on the frame 14 or the glass sheet 12, the first adhesive 24 is applied to the glass sheet 12 or the frame 14 in a third step 43. In a fourth step 44, the frame 14 is pressed onto the glass sheet 12, and in a fifth step 45, the first adhesive 24 is allowed to cure on the chuck 36. In embodiments, the first adhesive 24 is allowed to cure only partially, e.g., for no more than about 5 minutes (more particularly, no more than 1 minute).

After the first adhesive 24 is allowed to partially cure, the glass article 10 is removed from the chuck 36 in a sixth step 46.

In a seventh step 47 according to one or more embodiments, the glass article 10 is clamped to hold the glass sheet 12 against the frame 14, and the clamped glass article 10 is allowed to cure to handling strength. In embodiments, the glass sheet 12 may be clamped to the frame 14 while both are still on the chuck 36, and then the clamped glass article 10 is removed from the chuck 26 to finish curing. In embodiments, the cure time to handling strength at standard temperature and pressure (about 20° C. and 1 atm) and low humidity (e.g., less than about 20% or less than about 10% humidity) is from about 45 minutes to about one hour.

FIGS. 8A and 8B depict a clamped glass article 10 having a portion that is V-shaped and a glass article 10 having a portion that is C-shaped, respectively. As can be seen in FIG. 8A, the glass article 10 has clamps 49 positioned at regions of high tensile stress on the glass sheet 12 as shown in FIG. 4. Similarly, as shown in FIG. 8B, the glass article 10 having a portion that is C-shaped is clamped with clamps 49 in the regions of high tensile stress as shown in FIG. 5D. In the embodiments depicted in FIGS. 8A and 8B, the clamps 49 are one-sided, C-shaped clamps, but in other embodiments, the clamps 49 could be double-sided. For example, in embodiments, the clamps 49 may be rectangular bar clamps secured at each end. Further, for the purposes of illustration and to demonstrate the area of high tensile stress to be covered by the clamps 49, the clamps 49 are depicted as relatively thin compared to the width of the glass article 10, but in other embodiments, the clamps 49 can be wider so long as the clamps 49 are positioned to apply force to the areas of high tensile stress. That is, the clamps 49 do not have to only provide clamping pressure to the areas of high tensile stress. Clamping the glass article 10 helps ensure that the glass sheet 12 does not separate from the frame 14 while curing off of the chuck 36. Advantageously, by only curing partially and then removing from the chuck 36, the chuck 36 is freed up for forming another glass article 10, thereby reducing the cycle time for glass article 10 on the chuck 36 and increasing throughput.

Figure 9:
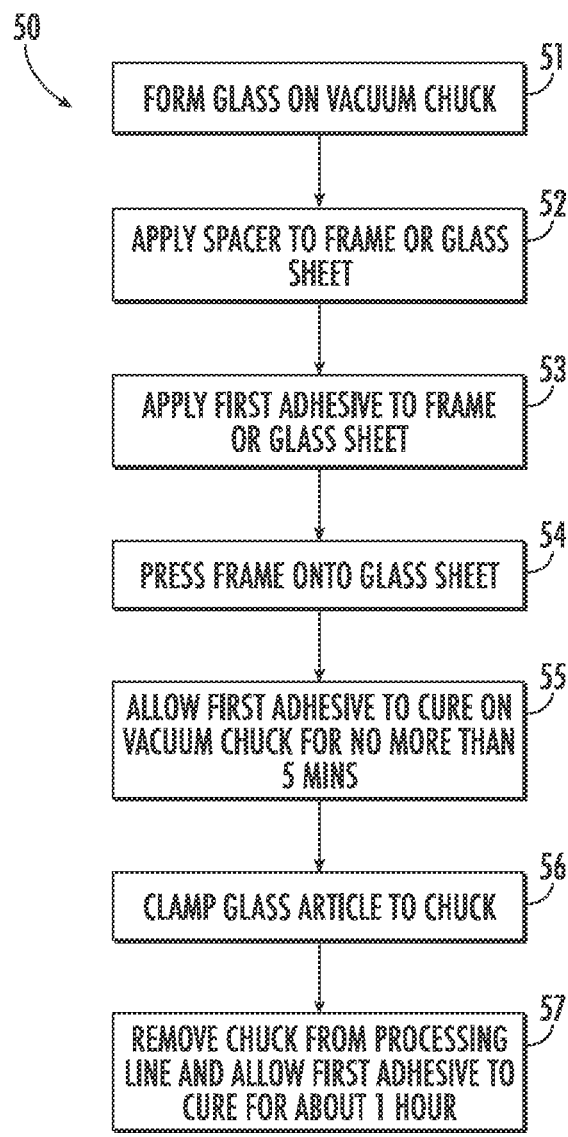
FIG. 9 depicts a flow diagram of a second method of forming a curved glass article, according to exemplary embodiments.

FIG. 9 depicts another embodiment of a method 50 of forming a curved glass article 10. In a first step 51 of the method 50, the glass sheet 12 is cold formed against the chuck 36 (e.g., using vacuuming forming as described above). In a second step 52, the spacer 48 is positioned on the glass sheet 12 or the frame 14 as described above (e.g., at the ends of the bend region 34 for a glass article having a portion that is V-shaped or a glass article having a portion that is C-shaped). In a third step 53, the first adhesive 24 is applied to the glass sheet 12 or frame 14, and in a fourth step 54, the frame 14 is pressed onto the glass sheet 12. In a fifth step 55, the glass sheet 12 is held to the chuck 36 using vacuum pressure as described above to allow the first adhesive 24 to partially cure. In embodiments, the glass sheet 12 is held to the chuck 36 using vacuum pressure for no more than five minutes (more particularly, no more than one minute).

Figure 10A:
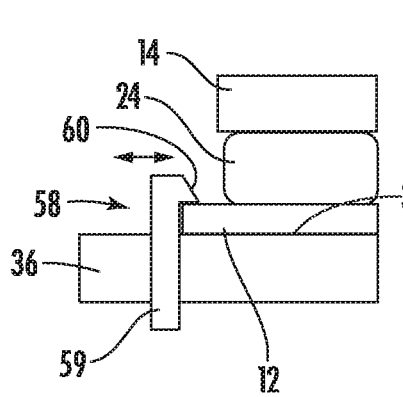
FIGS. 10A-10C depict various chuck clamps for holding the curved glass article against the chuck during curing, according to exemplary embodiments.
Figure 10B:
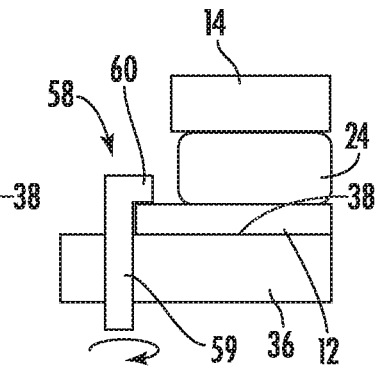
Figure 10C:
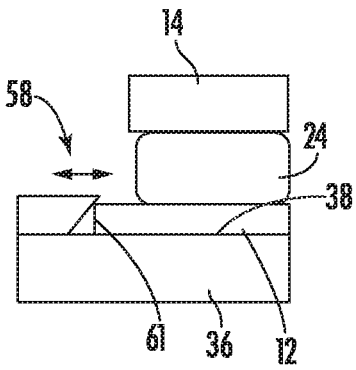

To this point, the method 50 is similar to the previously described method 40, but a difference arises in the sixth step 56 in which the glass article 10 is clamped to the chuck 36. According to the method 50, the chuck 36 is provided with one or more types of chuck clamp 58 as shown in FIGS. 10A-10C. In the sixth step 56, the chuck clamp 58 is moved from a first position in which it is not applying clamp pressure to the glass article 10 to a second position in which the chuck clamp 58 is applying clamp pressure to at least the glass sheet 12 to keep the glass sheet 12 in contact with the bending surface 38 of the chuck 36 without vacuum pressure. In a seventh step 57, the chuck 36 on which the glass article 10 is clamped is removed from the processing line so that the first adhesive 24 can cure to handling strength, e.g., over about 45 minutes to one hour. Advantageously, because the chuck 36 no longer needs vacuum pressure, the entire chuck 36 can be removed from the processing line to allow the glass article 10 time to cure, and the chuck 36 on which the glass article 10 is clamped can be replaced with another chuck 36 on which another glass article 10 can be formed. Again, by curing the glass article 10 offline, cycle time is reduced, and throughput is increased.

FIGS. 10A-10C depict embodiments of the chuck clamps 58. As shown in the embodiment of FIG. 10A, the chuck clamp 58 extends through or adjacent to the bending surface 38 of the chuck 36 and is translatable between the first position and the second position. The chuck clamp 58 of FIG. 10A includes a post 59 and an overhanging ledge 60. The post 59 extends a distance above the bending surface 38 such that the overhanging ledge 60 is at a height that corresponds to the thickness T1 of the glass sheet 12. As indicated by the double-ended arrow in FIG. 10A, the post 59 translates laterally between the first position and the second position. Further, in embodiments, the post 59 translates vertically to adjust the height of the overhanging ledge 60 to accommodate glass sheets 12 of different thicknesses T1.

FIG. 10B depicts another embodiment of a chuck clamp 58 in which the post 59 is rotatable between the first position and the second position. In embodiments, the post 59 extends through or adjacent to the bending surface 38 of the chuck 36, and the post 59 extends a distance above the bending surface 38 such that the overhang ledge 60 is at a height corresponding to the thickness T1 of the glass sheet 12. In embodiments, the post 59 may be threaded into the chuck 36 such that the overhang ledge 60 may be tightened down against the glass sheet 12 by rotating the post 59 into the chuck 36 so as to apply clamping pressure against the glass sheet 12.

FIG. 10C depicts still another embodiment of a chuck clamp 58 in which a tapered edge surface 61 is slidably engaged with the glass sheet 12. In embodiments of the chuck clamp 58 shown in FIG. 10C, the chuck clamp 58 is translatable relative to the chuck 36 by sliding over the bending surface 38 to engage the glass sheet 12. As can be seen in FIG. 10C, the among of clamping pressure applied by the chuck clamp 58 can be varied depending on the force exerted laterally on the chuck clamp 58. Because of the tapered edge surface 61, the lateral forces on the chuck clamp 58 are translated into downward clamping pressure exerted on the glass sheet 12 against the bending surface 38 of the chuck 36. Further, the tapered edge surface 61 allows the chuck clamp 58 to accommodate glass sheets 12 having a variety of different thicknesses T1. That is, relatively thicker glass sheets 12 will engage the chuck clamp 58 higher on the tapered edge surface 61 than relatively thinner glass sheets 12.

Any of the chuck clamps 58 depicted in FIGS. 10A-10C may be automatedly positioned or manually positioned. For example, the translatable embodiments of the chuck clamps 58 shown in FIGS. 10A and 10C may be spring-loaded such that, as the glass sheet 12 is pressed against the chuck 36, the chuck clamps 58 move out of the way of the glass sheet 12 to an extent to allow the glass sheet 12 to come into contact with the bending surface 38 of the chuck 36. Thereafter, the spring force may cause the chuck clamp 58 to move back in a position where the overhanging ledge 60 or tapered edge surface 61 is positioned over (at least partially) the glass sheet 12.

Figure 11A:
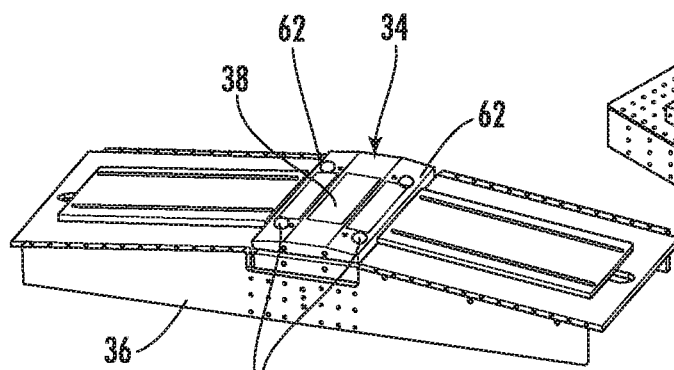
FIGS. 11A and 11B depict clamping locations for chuck clamps for glass article having a portion that is V-shaped and a glass article having a portion that is C-shaped, respectively, according to exemplary embodiments.
Figure 11B:
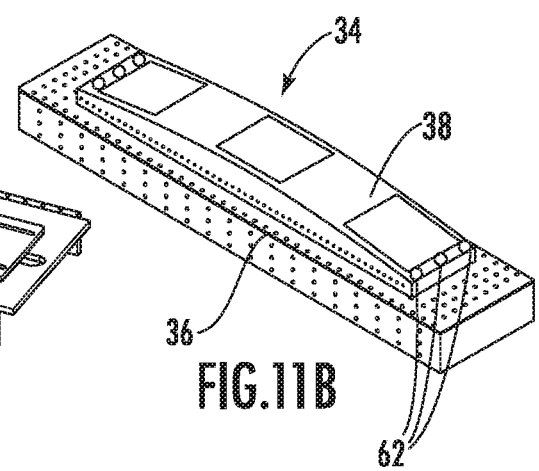

FIGS. 11A and 11B depict exemplary locations 62 for the chuck clamps 58 on the chuck 36 for a glass article 10 having a portion that is V-shaped and a glass article 10 having a portion that is C-shaped. Referring first to FIG. 11A, four chuck clamp locations 62 are depicted at the edge of the curved region 34 for the glass article 10 having a portion that is V-shaped. In FIG. 11B, six chuck clamp locations 62 are depicted for the chuck 36 configured to form a glass article 10 having a portion that is C-shaped, three each at the lateral edges or ends of the bending surface 38 of the chuck 36. As depicted in FIG. 5D, the tensile stress peaks not only on the longitudinal edge (path 3) but also increases steadily moving along the lateral edge (path 4) of the glass sheet 12 toward the midline of the lateral edge. Thus, in embodiments, an additional set of chuck clamps 58 are provided at a midline location of the lateral edge of the chuck 36.

Figure 12A:
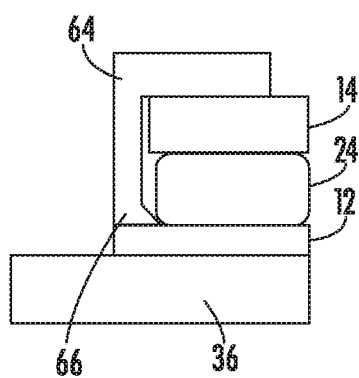
FIGS. 12A-12C depict clips for controlling tensile and compressive stresses on the glass sheet during curing, according to exemplary embodiments.
Figure 12B:
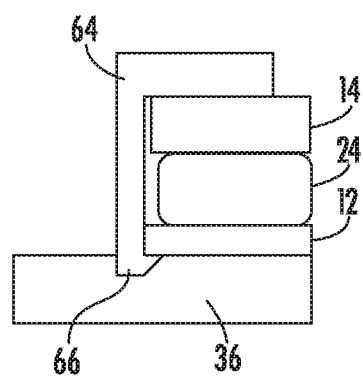
Figure 12C:
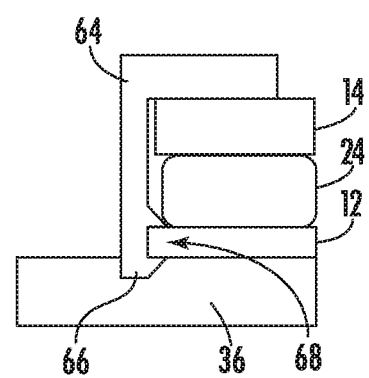

FIGS. 12A-12C depict various embodiments of a clips 64 configured to relieve tensile or compressive stresses at various locations of the glass article 10 during curing of the first adhesive 24. The clips 64 can be used in conjunction with the clamps 48 discussed in relation to method 40 or the chuck clamps 58 discussed in relation to method 50. In the first embodiment shown in FIG. 12A, the clip 64 attaches to the frame 14 and prevents compression of the bond line in regions where the compressive forces are higher than desired during cold-forming and curing. Thus, the clip 64 has a footing 66 that exerts pressure against the second major surface 20 of the glass sheet 12 so as to create a tensile stress to counteract undesired compressive stresses. FIG. 12B depicts another embodiment of a clip 64 configured to create compressive stress to counteract undesired tensile stresses. The clip 64 attaches to the frame 14, and the footing 66 is configured to engage the first major surface 18 of the glass sheet 12, pulling the glass sheet 12 against the frame 14. FIG. 12C depicts still another embodiment of a clip 64 that prevents undesired tensile and compressive stresses. In the embodiment of FIG. 12C, the clip 64 attaches to the frame 14, and a slot arm 67 is positioned at a specified distance of the glass sheet 12 relative to the frame 14. The slot arm 67 includes a slot 68 into which the glass sheet 12 is inserted. In this way, any compressive or tensile stresses that deviate the glass sheet 12 from the specified distance relative to the frame 14 are counteracted by the slot arm 67, which exerts pressure against the first major surface 18 or the second major surface 20 as may be needed to counteract the undesired stress.

Figure 13:
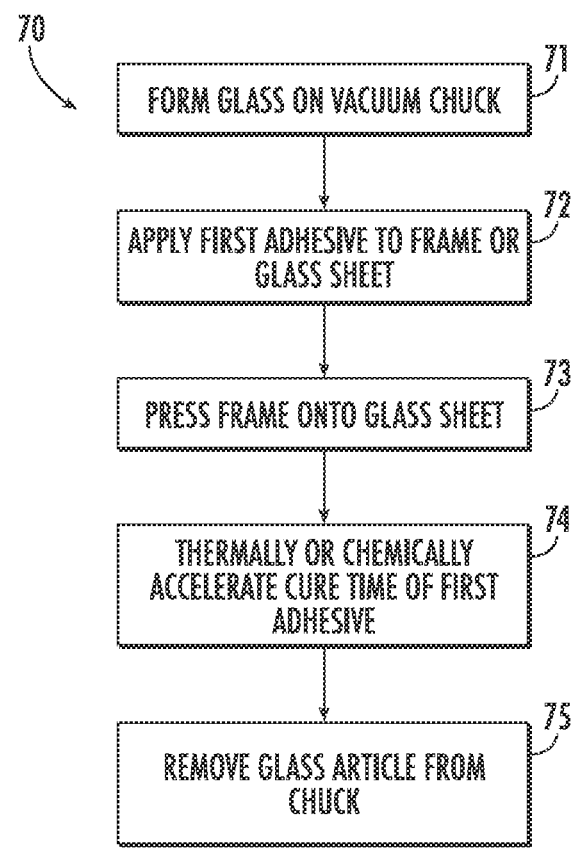
FIG. 13 depicts a flow diagram of a third method of forming a curved glass article, according to an exemplary embodiment.

FIG. 13 depicts a flow diagram for another method 70 for reducing cycle time of a glass article 10 in the processing line. In the method 70, the curing time of the first adhesive 24 is accelerated (at least locally) to reduce the time taken to achieve a full cure before removing the glass article 10 from the chuck 36. In a first step 71 of the method 70, the glass sheet 12 is cold-formed against the bending surface 38 of the chuck 36 (e.g., using vacuum pressure to hold the glass sheet 12 on the chuck 36). In a second step 72, the first adhesive 24 is applied to the glass sheet 12 or the frame 14, and in a third step 73, the frame 14 is pressed against the glass sheet 12. In a fourth step 74, the cure time of the first adhesive 24 is accelerated at least in local regions where tensile stress pulling the glass sheet 12 away from the frame 14 is expected to be high. In embodiments, curing of the first adhesive 15 is accelerated (at least locally) such that cure time is 50% or less, 25% or less, or 10% or less of the non-accelerated cure time (i.e., the cure time at standard temperature and pressure and 0% humidity). Thus, in the other described embodiments in which cure time at standard temperature and pressure and 0% humidity is approximately one hour, the accelerated cure time of step four 74 of method 70 is thirty minutes or less, fifteen minutes or less, or even six minutes or less. In a fifth step 75 of the method 70, the glass article 10 is removed from the chuck 36. According to the method 70, the accelerated cure time decreases cycle time and increases throughput by cycling the chuck 36 at least two times faster than conventional cold-forming processes.

Figure 14A:
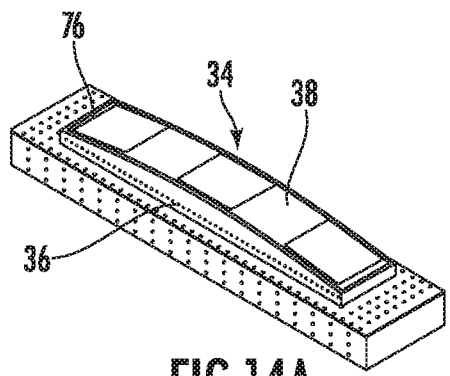
FIGS. 14A-14C depict heater placements for a heated chuck, according to exemplary embodiments.
Figure 14B:
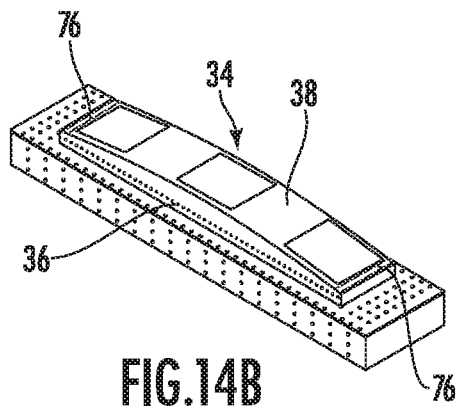
Figure 14C:
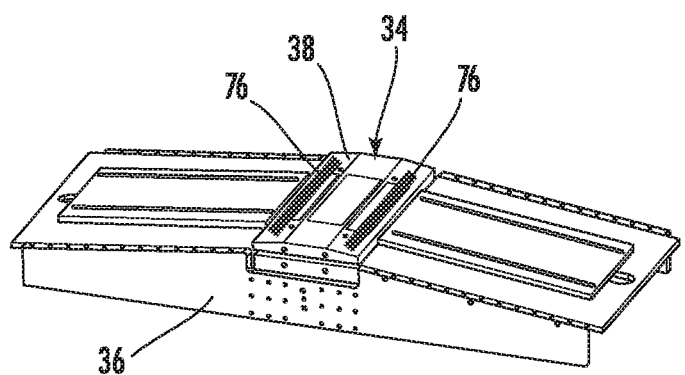

In the various embodiments described herein, curing of the first adhesive 24 can be accelerated in a variety of different ways. For example, the curing reaction can be accelerated thermally or chemically. FIGS. 14A-C depict various embodiments of a heated chuck 36. In the embodiment shown in FIG. 14A, the chuck 36 includes a heater 76 around the perimeter of the chuck 36. In embodiments, the heater is one or more of a strip heater (e.g., a tape heater) or a cartridge heater. Heating can be continuous or discontinuous around the perimeter. For example, the heating around the perimeter can be broken with air gaps or regions of water cooling. In the embodiment shown in FIGS. 14B and 14C, heating is local to a region where high tensile or compressive stresses are expected to develop. Thus, for example, as shown in FIG. 14B, heaters 76 are provided along the lateral edges of the chuck 36 for a glass article 10 having a portion that is C-shaped, and as shown in FIG. 14C, the heaters 76 are provided at the edges of the curved region 34. When using heating to accelerate the curing time, care must be taken to select a first adhesive that can be cured in an accelerated fashion using heat. In general, most two component adhesives can be thermally accelerated. Exemplary first adhesives 24 for which curing can be accelerated include BETASEAL™ X2500 Plus polyurethane adhesive (available from The Dow Chemical Company, Midland, MI) or Scotch-Weld™ DP604 epoxy adhesive (available from 3M, St. Paul, MN).

In another embodiment, curing is accelerated using heating without using a heated chuck 36 by preheating the glass sheet 12, the frame 14, and/or the chuck 36 prior to cold-forming. In still another embodiment, curing is accelerated by heating the entire glass article 10 and/or the chuck 36, e.g., in an oven or tunnel furnace after forming during the curing process. In still another embodiment, curing is accelerated by heating the first adhesive 24 as it is dispensed (e.g., using a heated dispenser on a robotic arm).

Figure 15:
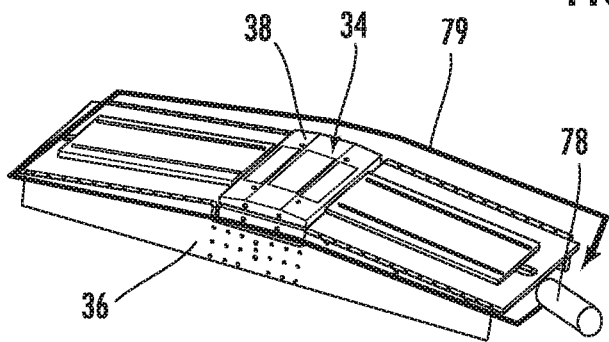
FIG. 15 depicts a chuck including a radiation source to accelerate curing, according to an exemplary embodiment.

In another embodiment depicted schematically in FIG. 15, curing is accelerated using a radiation source 78. For example, the first adhesive is selected to cure under the influence of a particular radiations, such as ultraviolet, infrared, or microwave radiation. In embodiments, the radiation source 78 travels across or around the chuck 36, e.g., along path 79 around the chuck 36, providing targeted radiation to accelerate curing of the first adhesive 24. In other embodiments, a radiation source 78 may be embedded in the bending surface 38 of the chuck 36, provided around the chuck 36, or directed at the first adhesive layer 24. For example, in an embodiment, the radiation source 78 is an infrared or ultraviolet light diffusing fiber embedded in the bending surface 38 of the chuck 36 in regions where adhesive will be applied to the glass sheet 12. Further, in embodiments, the radiation source 78 is provided only locally in regions where relatively high tensile or compressive stresses are expected. Still further, the radiation source 78 may be continuous or discontinuous over the region in which the cure is accelerated. Further, the radiation source 78 may be turned off/on in certain areas using a shutter or by masking sections of the glass article 10. By curing discontinuously, shrinkage can be prevented during an accelerated cure. That is, in embodiments, the discontinuous curing spot-welds or tacks the glass sheet in place to prevent shrinkage that might otherwise occur during an accelerated cure.

Figure 16:
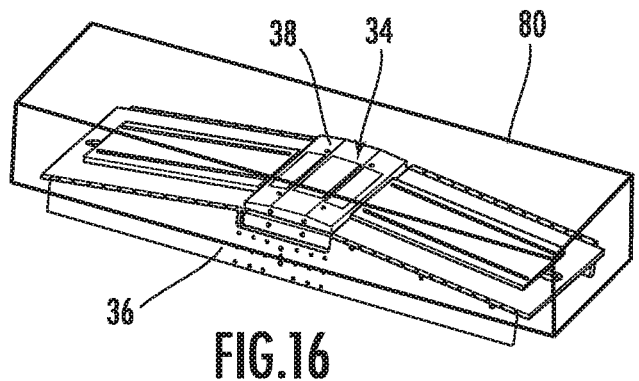
FIG. 16 depicts a steam chamber provided over a chuck to accelerate curing, according to an exemplary embodiment.

FIG. 16 depicts an embodiment in which the curing of the first adhesive 24 is accelerated using a steam chamber 80 to catalyze the curing reaction. In an exemplary embodiment, the glass article 10 is formed on the chuck 36 and then a steam chamber 80 is lowered over the chuck 36 or the chuck 36 is conveyed into a steam chamber 80 on a processing line. The steam chamber 80 is filled with steam, which catalyzes the curing reaction. Each of the apparatuses for accelerating curing described in the foregoing paragraphs and shown in FIGS. 14A-16 can be used alone or in combination with one or more of the other apparatuses to accelerate curing of the first adhesive 24 according to the method 70 shown in FIG. 13.

After forming and curing the glass article 10, the first adhesive 24 in general keeps the glass sheet 12 bonded to the frame 14. However, for tight curvatures (e.g., having a bend radius of 10,000 mm or less) and small bezel widths, the glass article 10 may include one or more mechanical retainers 90 to provide compressive stress on the first major surface 18 of the glass article 10 to prevent delamination of the glass sheet 12 from the frame 14 at extreme operating temperatures.

Figure 17:
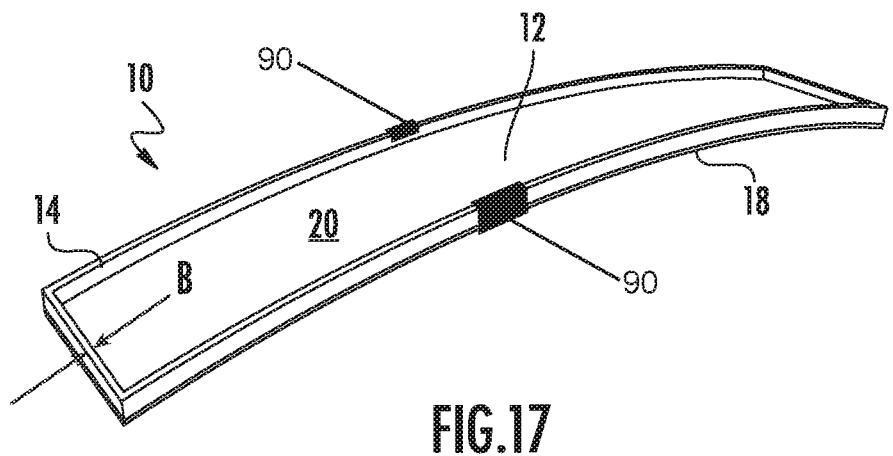
FIG. 17 depicts a cold-formed glass article having a tight radius of curvature and a small bezel width with a mechanical retainer pressing the glass sheet to the frame, according to an exemplary embodiment.

FIG. 17 depicts an embodiment of a glass article 10 having a tight radius of curvature and a thin bezel of the frame 14. As used herein, the "bezel" is the portion of the frame 14 in contact with the second major surface 20 of the glass sheet 12. Thus, the bezel defines the bonding area between glass sheet 12 and the frame 14. Further, as used herein a "thin bezel" is one having a maximum width B of 10 mm. In embodiments, the width B of the bezel is 5 mm or less, in particular 3 mm or less. At a radius of curvature R1 (as described herein), and in some examples, where R1 is about 250 mm or less, and with a thin bezel, the first adhesive may be under tensile and/or shear stress that is about 60% or more of the respective tensile and/or shear strength of the first adhesive. In such circumstances, the glass sheet may delaminate from the frame when the glass article is exposed to further tensile and/or shear stress resulting from temperature extremes.

Figure 18:
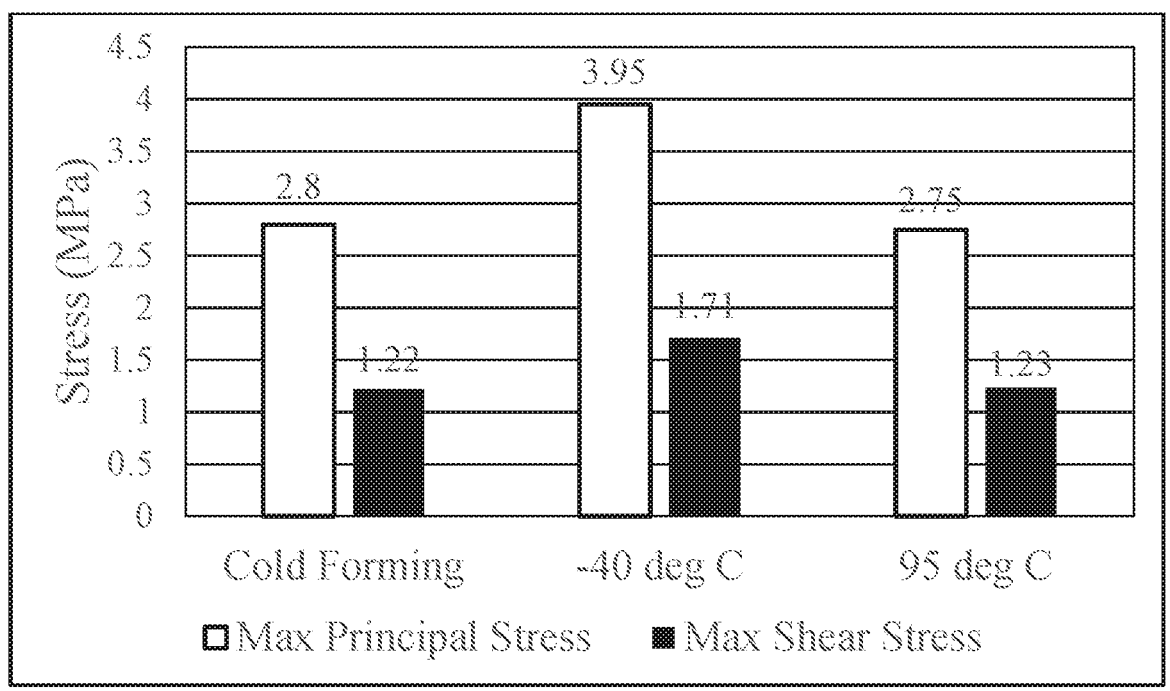
FIG. 18 is a graph of tensile and shear stress in an adhesive between a frame and a glass sheet of a glass article at room temperature and at two temperature extremes.

FIG. 18 depicts a graph of tensile and shear stresses for a first adhesive 24 after cold forming, at a temperature of −40° C., and at a temperature of 95° C. The temperature extremes represent, e.g., an extreme cold and heat that may be experienced in certain climate regions (e.g., extreme northern or southern geographic locations or deserts) or during winter and summer, respectively. For the particular first adhesive considered, the tensile strength is 3.8 MPa at room temperature, and the shear strength is 4.3 MPa at room temperature. As can be seen in FIG. 18, the residual tensile stress in the glass article (from the first adhesive holding the cold-formed glass sheet in the bent configuration) is already 2.8 MPa, which is over 70% of the tensile strength of the first adhesive. Thus, there is not much margin to account for additional stresses associated with exposure to temperature extremes.

Figure 19:
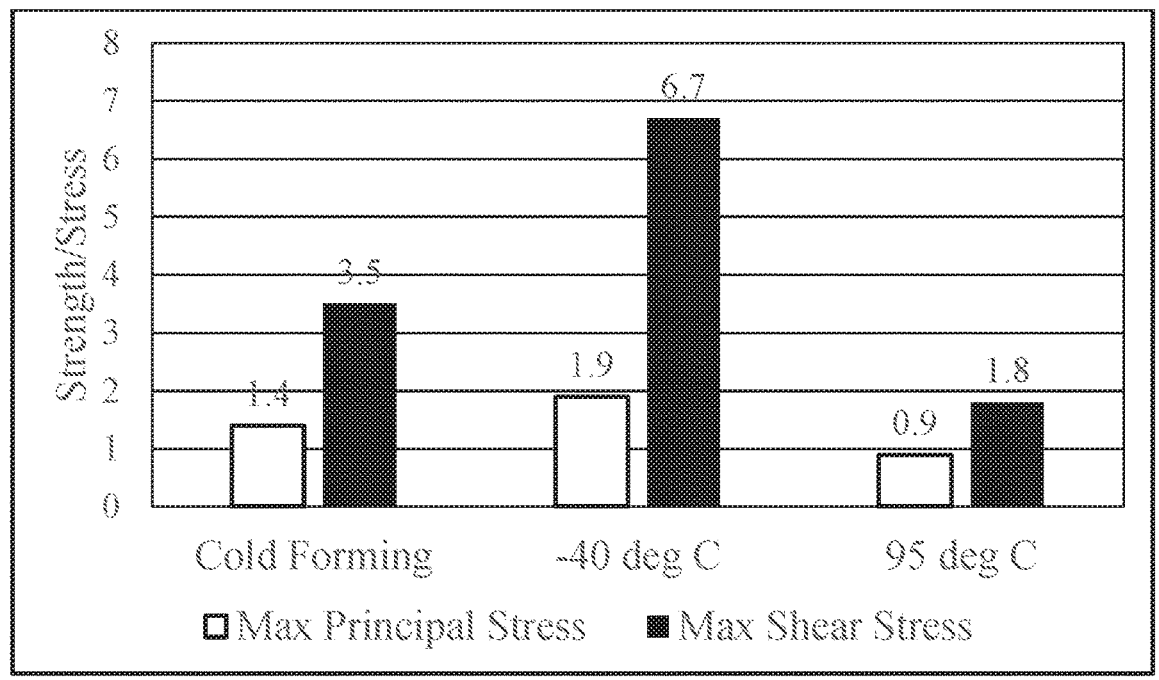
FIG. 19 is a graph of the ratio of tensile and shear strength to tensile and shear stress for the adhesive considered in the graph of FIG. 18.

FIG. 19 depicts a graph showing the ratio of tensile and shear strength to tensile and shear stress experienced in the glass article at room temperature and at the temperature extremes of −40° C. and 95° C. In order to provide adequate margin against delamination, Applicant has determined that the ratio of tensile and shear strength to tensile and shear stress should be kept below 3.0 over the range of operating temperatures. In particular, in embodiments, the ratio of tensile and shear strength to the tensile and shear stress associated with cold forming (i.e., not considering thermally induced stresses) is preferably kept below 5.0 in the glass article. However, as can be seen in FIG. 19, the ratio of tensile strength to tensile stress can be below 2.0 over the range of operating temperatures for certain glass articles having a tight bend radius of below 250 mm and a bezel width of 10 mm or less, in particular 5 mm or less. Indeed, at 95° C., the ratio of tensile strength to tensile stress is below 1.0 for such glass articles, indicating that that the tensile stress exceeds the tensile strength and delamination is likely. Further, at 95° C., the ratio of shear strength to shear stress also drops below the desired ratio of 3.0, in particular to below 2.0.

Figure 20:
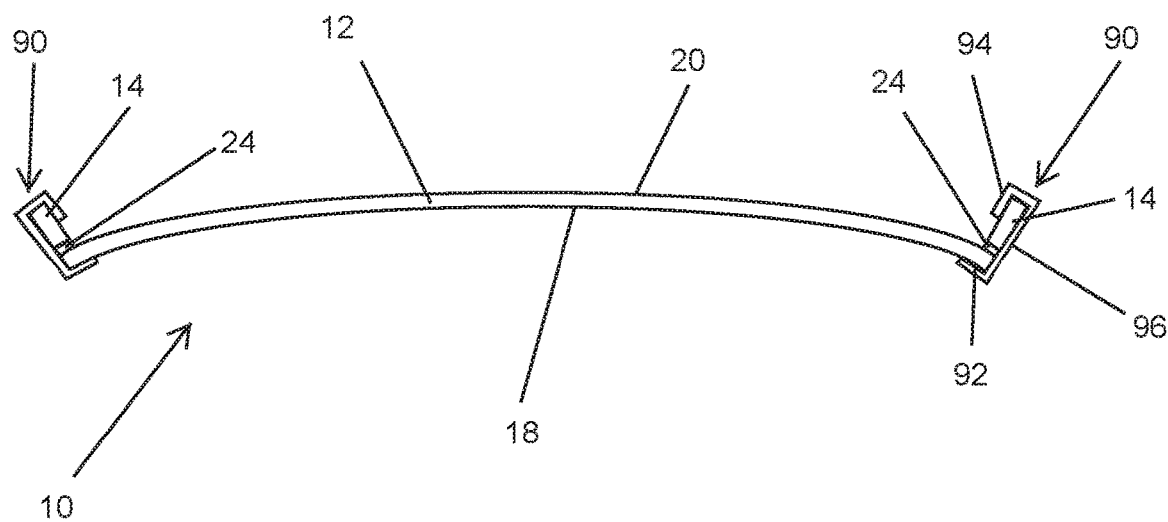
FIG. 20 depicts a glass article having a mechanical retainer applying a compressive stress to a surface of the glass sheet to counteract tensile and shear stresses developed in the adhesive, according to an exemplary embodiment.

Accordingly, as depicted in FIG. 20, the glass article 10 is provided with a mechanical retainer 90 in order to provide additional compressive stresses on the first major surface 18 of the glass sheet 12 to counter act the residual and thermal tensile and shear stresses. In the embodiment depicted, the mechanical retainer 90 is a clip having a first leg 92, a second leg 94, and a cross member 96 joining the first leg 92 to the second leg 94. The mechanical retainer 90 in the form of a clip is made of a resilient material so that the first leg 92 exerts pressure on the first major surface 18 of the glass sheet 12. The second leg 94 connects to the frame 14 to provide an anchoring point for the mechanical retainer 90. In embodiments, the mechanical retainer 90 is made from a metal, plastic, or composite material.

In embodiments, the mechanical retainer 90 may extend around the entire perimeter of the glass article 10 or only a portion of the perimeter of the glass article 10. For example, in embodiments, the mechanical retainer 90 may only extend over the curved region 34 of the glass article 10 and not extend over the flat sections 32. Further, in embodiments, a plurality of mechanical retainers 90 may be used around the perimeter of the glass article 10 in curved regions 34 and/or flat sections 32. In embodiments, the plurality of mechanical retainers 90 may be periodically spaced in regular or irregular intervals.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass sheet 12 may be strengthened. In one or more embodiments, glass sheet 12 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 12 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 12 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheet may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T1 of the glass sheet (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass sheet may have a CS (which may be found at the surface or a depth within the glass sheet) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass sheet may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass sheet 12 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %.

In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 12 may be made from any glass composition falling with any one of the exact numerical ranges discussed above.

Aspect (1) of this disclosure pertains to a method of cold-forming a glass article, comprising the steps of: bending a glass sheet comprising a first major surface and a second major surface opposite the first major surface over a bending surface of a chuck such that the first major surface of the glass sheet conforms to the bending surface of the chuck and comprises a first region having a first radius of curvature; disposing a frame having a curved surface comprising a second region with a second radius of curvature on the second major surface, the second radius of curvature matching is within 10% of the first radius of curvature; positioning at least one spacer in the first region of the glass sheet article or in the second region on the curved surface of the frame; and adhering the curved surface of the frame to the second major surface of the glass sheet article such that the spacer is provided between the glass sheet article and the frame.

Aspect (2) of this disclosure pertains to the method of Aspect (1), wherein adhering the curved surface of the frame to the second major surface of the glass sheet comprises curing an adhesive disposed on one of or both the second major surface of the glass sheet and the curved surface of the frame.

Aspect (3) of this disclosure pertains to the method of Aspect (1) or Aspect (2), wherein the bending surface comprises a first flat section, a second flat section, and a curved section between the first flat section and the second flat section, wherein the curved section comprises the first radius of curvature of the bending surface, wherein the at least one spacer comprises a first spacer and a second spacer, and wherein the first spacer is positioned at a first end of the curved section adjacent to the first flat section and the second spacer is positioned at a second end of the curved section adjacent to the second flat section.

Aspect (4) of this disclosure pertains to the method of Aspect (1) or Aspect (2), wherein the bending surface comprises a continuous curve comprises the first radius of curvature, wherein the continuous curve spans between a first end of the glass sheet and a second end of the glass sheet wherein the at least one spacer comprises a first spacer and a second spacer, and wherein the first spacer is positioned at the first end of the glass sheet and the second spacer is positioned at the second end of the glass sheet.

Aspect (5) of this disclosure pertains to the method of any one of Aspects (2) through (4), wherein curing the adhesive comprises applying a force to hold the glass sheet against at least one of the chuck or the frame until the adhesive fully cures.

Aspect (6) of this disclosure pertains to the method of Aspect (5), wherein curing the adhesive further comprises allowing the adhesive to partially cure on the chuck for no more than five minutes before the step of applying a force.

Aspect (7) of this disclosure pertains to the method of Aspect (6), further comprising the step of removing the glass sheet and the frame from the chuck after the step of allowing the adhesive to partially cure, and wherein the step of applying a force comprises clamping the glass sheet to the frame.

Aspect (8) of this disclosure pertains to the method of any one of Aspects (1) through (7), wherein the curved surface comprises a V-shaped surface comprising a curved section disposed between a first flat section and a second flat section.

Aspect (9) of this disclosure pertains to the method of Aspect (8), wherein the step of applying a force further comprises clamping the glass sheet to the frame in a first location in the curved section proximal to the first flat section and in a second location in the curved section proximal to the second flat section.

Aspect (10) of this disclosure pertains to the method of any one of Aspects (1) through (7), wherein the curved surface comprises a C-shaped curvature comprising a continuous curve between a first end of the frame and a second end of the frame.

Aspect (11) of this disclosure pertains to the method of Aspect (10), wherein the step of applying a force further comprises clamping the glass sheet to the frame proximal to the first end and proximal to the second end.

Aspect (12) of this disclosure pertains to the method of Aspect (11), further comprising clamping the glass sheet to the frame proximal to a center point between the first end and the second end.

Aspect (13) of this disclosure pertains to the method of any one of Aspects (6) through (12), further comprising the step of applying vacuum pressure between the glass sheet and the chuck during the step of allowing the adhesive to partially cure.

Aspect (14) of this disclosure pertains to the method of Aspect (13), wherein the chuck comprises a set of rotatable clamps and wherein the step of applying a force further comprises rotating the set of rotatable clamps to clamp the glass sheet to the chuck.

Aspect (15) of this disclosure pertains to the method of Aspect (13), wherein the chuck comprises a set of translatable clamps and wherein the step of applying a force further comprises laterally translating the set of translatable clamps to clamp the glass sheet to the chuck.

Aspect (16) of this disclosure pertains to the method of Aspect (14) or Aspect (15), wherein the rotatable or translatable clamps are configured to apply clamping pressure at ends of the first region of the first curvature.

Aspect (17) of this disclosure pertains to the method of any one of Aspects (1) through (16), further comprising the step of attaching a plurality of clips to the frame that prevent at least one of compression or tension of the adhesive between the frame and the glass sheet.

Aspect (18) of this disclosure pertains to a method of cold-forming a glass article, comprising the steps of: bending a glass sheet over a bending surface, wherein the bending surface comprises a first region with a first radius of curvature, wherein the glass sheet comprises a first major surface and a second major surface opposite to the first major surface, and wherein bending the glass sheet causes the first major surface to conform to first radius of curvature of the bending surface; applying an adhesive to the second major surface of the glass sheet or to the curved surface of the frame and curing the adhesive for a first cure time; disposing a frame having a curved surface comprising a second region with a second radius of curvature on the adhesive, the second radius of curvature is within 10% of the first radius of curvature; adhering the curved surface of the frame to the second major surface of the glass sheet using the adhesive; and curing at least a portion of the adhesive for a second cure time using an accelerant, the second cure time being less than half the first cure time.

Aspect (19) of this disclosure pertains to the method of Aspect (18), wherein the accelerant is heat, wherein the bending surface comprises a heater configured to apply localized heat to the adhesive, and wherein the step of curing further comprises heating the adhesive to accelerate curing.

Aspect (20) of this disclosure pertains to the method of Aspect (19), wherein the localized heat is applied in the first region of the first radius of curvature.

Aspect (21) of this disclosure pertains to the method of any one of Aspects (18) through (20), wherein the bending surface comprises a V-shaped surface comprising a curved section disposed between a first flat section and a second flat section and wherein the step of heating further comprises heating the glass sheet in a first location in the curved section proximal to the first flat section and in a second location in the curved section proximal to the second flat section.

Aspect (22) of this disclosure pertains to the method of any one of Aspects (18) through (20), wherein the bending surface comprises a C-shaped surface comprising a continuous curve between a first end of the bending surface and a second end of the bending surface and wherein the step of heating further comprises heating the glass sheet proximal to the first end and proximal to the second end.

Aspect (23) of this disclosure pertains to the method of any one of Aspects (18) through (22), wherein the step of heating further comprises heating longitudinal sides of the bending surface perpendicular to the first end and the second end such that a perimeter of the bending surface is heated.

Aspect (24) of this disclosure pertains to the method of any one of Aspects (19) through (23), wherein the heater comprises a radiation source configured to move across the bending surface.

Aspect (25) of this disclosure pertains to the method of Aspect (24), wherein the step of heating further comprises moving the radiation source along at least one edge of the bending surface.

Aspect (26) of this disclosure pertains to the method of Aspect (25), further comprising the step of heating the at least one edge continuously.

Aspect (27) of this disclosure pertains to the method of Aspect (25), further comprising the step of heating the at least one edge discontinuously.

Aspect (28) of this disclosure pertains to the method of any one of Aspects (18) through (27), wherein the accelerant is steam and wherein the method further comprises exposing the glass sheet, adhesive, and frame to the steam to accelerate curing.

Aspect (29) of this disclosure pertains to the method of any one of Aspects (18) through (28), wherein the accelerant is heat and wherein the method further comprises preheating at least one of the glass sheet or the frame prior to the step of applying the adhesive.

Aspect (30) pertains to a system for fabricating a glass article, the glass article comprising a cold-formed glass sheet adhered to a curved frame, the system comprising: a chuck having a bending surface comprising a first region with a first radius of curvature; and a set of clamps configured to clamp the glass sheet to the bending surface of the chuck; wherein the clamps are movable between a first position in which the clamps do not exert a clamping pressure on the glass sheet and a second position in which the clamps do exert a clamping pressure on the glass sheet.

Aspect (31) of this disclosure pertains to the system of Aspect (30), wherein the clamps are rotatable between the first position and the second position.

Aspect (32) of this disclosure pertains to the system of Aspect (31), wherein the clamps are laterally translatable between the first position and the second position.

Aspect (33) of this disclosure pertains to the system of any one of Aspects (30) through (32), further comprising a plurality of clips configured for attachment to the frame, wherein the plurality of clips prevents at least one of compression or tension on an adhesive between the curved frame and the cold-formed glass sheet during curing.

Aspect (34) of this disclosure pertains to the system of any one of Aspects (30) through (33), wherein the bending surface is a V-shaped surface comprising a curved section disposed between a first flat section and a second flat section and wherein the set of clamps are configured to hold the glass sheet against the bending surface in the curved section.

Aspect (35) of this disclosure pertains to the system of any one of Aspects (30) through (34), wherein the bending surface is a C-shaped surface comprising a continuous curve between a first end of the chuck and a second end of the chuck and wherein the set of clamps are configured to hold the glass sheet against the bending surface at the first end and at the second end.

Aspect (36) of this disclosure pertains to a system for fabricating a glass article, the glass article comprising a cold-formed glass sheet adhered to a curved frame, the system comprising: a chuck having a bending surface comprising a first region with a first curvature; and a heating element configured to accelerate a curing process of an adhesive adhering the glass sheet to the curved frame.

Aspect (37) of this disclosure pertains to the system of Aspect (36), wherein the heating element comprises a cartridge heater embedded in the region of the first curvature.

Aspect (38) of this disclosure pertains to the system of Aspect (36), wherein the heating element comprises a tape heater disposed on the at least one edge of the bending surface or disposed in the first region of the first curvature.

Aspect (39) of this disclosure pertains to the system of any one of Aspects (36) through (38), wherein the bending surface is a V-shaped surface comprising a curved section disposed between a first flat section and a second flat section and wherein the heating element is disposed in the curved section.

Aspect (40) of this disclosure pertains to the system of any one of Aspects (36) through (38), wherein the bending surface is a C-shaped surface comprising a continuous curve between a first end of the chuck and a second end of the chuck and wherein the heating element is disposed at the first end and the second end.

Aspect (41) of this disclosure pertains to the system of Aspect (40), wherein the heating element is further disposed along longitudinal sides of the bending surface perpendicular to the first end and the second end such that a perimeter of the glass sheet is heated.

Aspect (42) of this disclosure pertains to the system of any one of Aspects (36) through (41), wherein the heater comprises a radiation source configured to move across the chuck.

Aspect (43) of this disclosure pertains to the system of any one of Aspects (36) through (42), wherein the heating element comprises a steam source.

Aspect (44) of this disclosure pertains to a glass article, comprising: a glass sheet comprising a first major surface and a second major surface opposite to the first major surface comprising a radius of curvature of 10,000 mm or less; a frame adhered to the second major surface of the glass sheet using an adhesive, the frame comprising a curved surface comprising a radius of curvature that is within 10% of the radius of curvature of the glass sheet, and comprising a bezel at least partially around a perimeter of the glass sheet, the bezel having a width of 10 mm or less; at least one mechanical retainer attached to the glass sheet and to the frame, the at least one mechanical retainer configured to apply a compressive stress to the first major surface of the glass sheet; wherein the adhesive comprises a tensile strength; wherein tensile stress is present in the adhesive from holding the glass sheet at the radius of curvature; and wherein the compressive stress from the at least one mechanical retainer maintains a ratio of the tensile strength to the tensile stress of at least 3.0 over a range of temperatures of from −40° C. to 95° C.

Aspect (45) of this disclosure pertains to the glass article of Aspect (44), wherein the adhesive further comprises a shear strength, wherein shear stress is also present in the adhesive from holding the glass sheet at the radius of curvature, and wherein the compressive stress from the mechanical retainer maintains a ratio of the shear strength to the shear stress of at least 3.0 over a range of temperatures of from −40° C. to 95° C.

Aspect (46) of this disclosure pertains to the glass article of Aspect (44) or Aspect (45), wherein, at room temperature, the tensile stress present in the adhesive from holding the glass sheet at the radius of curvature is less than ⅓ of the tensile strength.

Aspect (47) of this disclosure pertains to the glass article of any one of Aspects (44) through (46), wherein the at least one mechanical retainer comprises a clip having a first leg in contact with the first major surface of the glass sheet, a second leg connected to the frame, and a cross member joining the first leg to the second leg.

Aspect (48) of this disclosure pertains to the glass article of Aspect (47), wherein the clip comprises a metal, plastic, or composite material.

Aspect (49) of this disclosure pertains to the glass article of any one of Aspects (44) through (47), wherein the bezel is 5 mm or less.

Aspect (50) of this disclosure pertains to the glass article of any one of Aspects (44) through (48), wherein the radius of curvature is located in a bend region of the glass sheet and wherein the at least one mechanical retainer is provided on the glass sheet in a bend region.

Aspect (51) of this disclosure pertains to the glass article of Aspect (50), wherein the frame defines a flat section adjacent to the bend region and wherein no mechanical retainer is provided in the flat section.

Aspect (52) of this disclosure pertains to the glass article of any one of Aspects (44) through (51), wherein the first major surface and the second major surface define a thickness of the glass sheet and wherein the thickness is 1.5 mm or less.

Aspect (53) of this disclosure pertains to the glass article of any one of Aspects (44) through (52), wherein the glass sheet comprises at least one of soda lime glass, aluminosilicate glass, borosilicate glass, boroaluminosilicate glass, alkali-containing aluminosilicate glass, alkali-containing borosilicate glass, and alkali-containing boroaluminosilicate glass.

Aspect (54) of this disclosure pertains to the glass article of any one of Aspects (44) through (53), further comprising at least one of a display or touch panel bonded to the second major surface of the glass sheet.

Aspect (55) of this disclosure pertains to the glass article of Aspect (54), wherein the display comprises at least one of a liquid crystal display (LCD), a light emitting diode (LED) display, an organic LED (OLED) display, or a plasma display.

Aspect (56) of this disclosure pertains to the glass article of any one of Aspects (44) through (55), wherein at least one of the first major surface or the second major surface comprises a surface treatment.

Aspect (57) of this disclosure pertains to the glass article of Aspect (56), wherein the surface treatment comprises at least one of an anti-glare surface treatment, an anti-reflective surface treatment, haptic feedback, or an easy-to-clean surface treatment.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article, comprising:
    a glass sheet comprising a first major surface and a second major surface opposite to the first major surface comprising a radius of curvature of 10,000 mm or less;
    a frame adhered to the second major surface of the glass sheet using an adhesive, the frame comprising a curved surface comprising a radius of curvature that is within 10% of the radius of curvature of the glass sheet, and comprising a bezel at least partially around a perimeter of the glass sheet, the bezel having a width of 10 mm or less;
    at least one mechanical retainer attached to the glass sheet and to the frame, the at least one mechanical retainer configured to apply a compressive stress to the first major surface of the glass sheet;
    wherein the adhesive comprises a tensile strength;
    wherein tensile stress is present in the adhesive from holding the glass sheet at the radius of curvature; and
    wherein the compressive stress from the at least one mechanical retainer maintains a ratio of the tensile strength to the tensile stress of at least 3.0 over a range of temperatures of from −40° C. to 95° C.

2. The glass article of claim 1, wherein the adhesive further comprises a shear strength, wherein shear stress is also present in the adhesive from holding the glass sheet at the radius of curvature, and wherein the compressive stress from the mechanical retainer maintains a ratio of the shear strength to the shear stress of at least 3.0 over a range of temperatures of from −40° C. to 95° C.

3. The glass article of claim 1, wherein, at room temperature, the tensile stress present in the adhesive from holding the glass sheet at the radius of curvature is less than ⅕ of the tensile strength.

4. The glass article according to claim 1, wherein the at least one mechanical retainer comprises a clip having a first leg in contact with the first major surface of the glass sheet, a second leg connected to the frame, and a cross member joining the first leg to the second leg.

* * * * *